(12) United States Patent
Sunahara

(10) Patent No.: US 8,391,616 B2
(45) Date of Patent: Mar. 5, 2013

(54) INFORMATION PROCESSOR AND METHOD THEREFOR

(75) Inventor: Sei Sunahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 704 days.

(21) Appl. No.: 12/580,440

(22) Filed: Oct. 16, 2009

(65) Prior Publication Data

US 2010/0150454 A1    Jun. 17, 2010

(30) Foreign Application Priority Data

Dec. 17, 2008    (JP) .................. 2008-321221

(51) Int. Cl.
*G06K 9/68* (2006.01)
*G06K 9/46* (2006.01)
(52) U.S. Cl. ...................... 382/218; 382/232
(58) Field of Classification Search .............. 382/209, 382/218, 232–233
See application file for complete search history.

(56) References Cited

U.S. PATENT DOCUMENTS

| 7,506,071 B2* | 3/2009 | Ayres et al. .................. 709/247 |
| 2004/0071353 A1 | 4/2004 | Dijk et al. |
| 2006/0198443 A1 | 9/2006 | Liang et al. |
| 2007/0279683 A1 | 12/2007 | Iwami et al. |
| 2008/0063078 A1 | 3/2008 | Futenma et al. |
| 2008/0107040 A1 | 5/2008 | Mizoguchi et al. |
| 2008/0112489 A1 | 5/2008 | Malladi et al. |
| 2008/0253666 A1* | 10/2008 | Le Leannec et al. ......... 382/232 |
| 2009/0102686 A1 | 4/2009 | Fukuhara et al. |

FOREIGN PATENT DOCUMENTS

| JP | 2006-502645 | 1/2006 |
| JP | 2007-311924 | 11/2007 |
| JP | 2008-532430 | 8/2008 |
| JP | 2008-252333 | 10/2008 |

OTHER PUBLICATIONS

Office Action issued Sep. 30, 2010, in Japan Patent Application No. 2008-321221.
European Search Report issued Dec. 16, 2010, in Patent Application No. 09179442.0.
F. W. Mounts, "A Video Encoding System With Conditional Picture-Element Replenishment", The Bell System Technical Journal, vol. 48, No. 7, XP-008004929, Sep. 1, 1969, pp. 2545-2554.
Ron Frederick, "Experiences with real-time software video compression", XEROX PARC, ftp://ftp.parc.xerox.com/pub/net-research/nv-paper, XP-002607141, Jul. 22, 1994, pp. 1-4.

(Continued)

*Primary Examiner* — Daniel Mariam
(74) *Attorney, Agent, or Firm* — Oblon, Spivak, McClelland, Maier & Neustadt, L.L.P.

(57) ABSTRACT

An information processor, which includes: an analyzer configured to analyze image data, obtain similarity between the image data, which is to be processed, and reference image data and determine whether or not the image data and the reference image data are similar to each other depending on whether or not the similarity reaches a predetermined threshold; an encoder configured to encode the image data; a discarding section configured to discard the image data if it is determined, as a result of the analysis by the analyzer, that the image data is similar to the reference image data; and a transmitter configured to transmit encoded data generated from the image data encoded by the encoder if it is determined, as a result of the analysis by the analyzer, that the image data is not similar to the reference image data.

9 Claims, 20 Drawing Sheets

OTHER PUBLICATIONS

Wim Sweldens, "The Lifting Scheme: A Custom-Design Construction of Biorthogonal Wavelets", Applied and Computational Harmonic Analysis, vol. 3, No. 2, 1996, pp. 186-200.

Christos Chrysafis, et al., "Line-Based, Reduced Memory, Wavelet Image Compression", IEEE Transactions on Image Processing, vol. 9, No. 3, Mar. 2000, pp. 378-389.

* cited by examiner

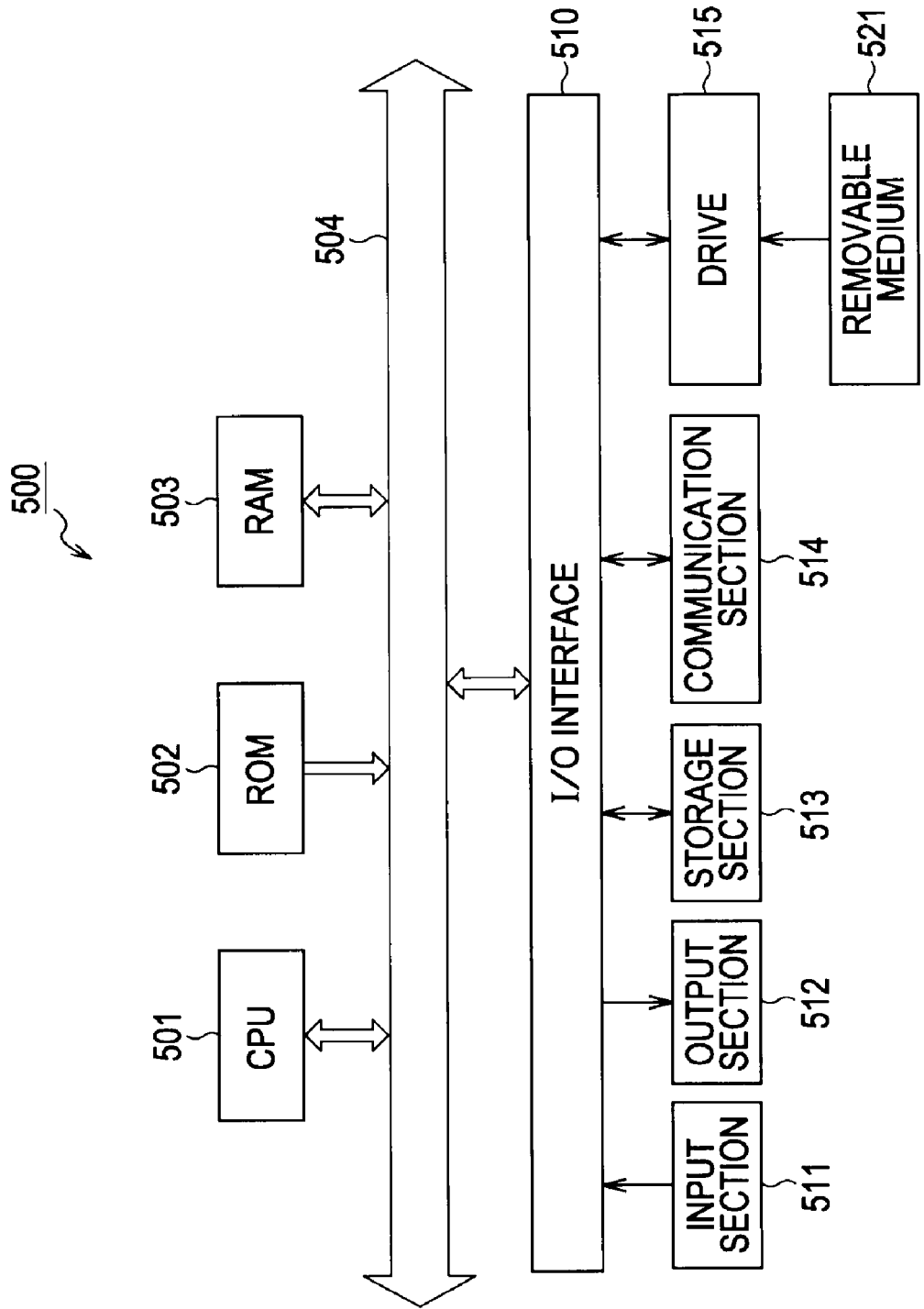

INFORMATION PROCESSOR AND METHOD THEREFOR

BACKGROUND OF THE INVENTION

1. Field of the Invention

The present invention relates to an information processor and method therefor. More particularly, the invention relates to an information processor which uses a narrower transmission band while controlling image quality deterioration in image data transmission and a method therefor.

2. Description of the Related Art

In digital video communication, images are usually transmitted in a compressed state because of limited bandwidth. Two different methods may be employed to compress images: intra-frame compression using relevance between images; and inter-frame compression using no relevance between images.

An Example of intra-frame compression is the moving picture experts group (MPEG) system. In the intra-frame compression system, a high compression ratio can be achieved by assigning data only to portions with changes among images. If, however, there is an error in the data, influence thereof may continue for a while.

An Example of inter-frame compression is the joint photographic experts group (JPEG) 2000 system. The inter-frame compression system does not utilize correlation and therefore is inferior to the intra-frame compression system in terms of compression ratio. However, if there is an error in the data, the error in the data has not effect outside of the image of interest.

Recently, there has been an increasing demand for transmitting multimedia data with a short delay time via the Internet or other transmission lines. An Exemplary application thereof is a remote operation system in which two remote medical facilities are connected by, for example, the Internet. Operation scenery in an operating room in one of the facilities is transmitted as moving images to a remote operating room in the other of the facilities, where an operator manipulates surgical instruments looking at incoming moving images. In such an application, it is necessary to transmit the moving images with a delay time not longer than several frame intervals.

In order to meet such a demand, Japanese Unexamined Patent Application Publication No. 2007-311924 discloses a system of compression encoding through wavelet transformation in which several lines in each picture of the moving image are considered as a compression encoding block. In the disclosed system, the encoding device can start compression encoding before all the data in the picture is input. If the compressed data is transmitted via a network and is decoded by a receiver side, the decoding device can start decoding before all the data in the picture is received. Accordingly, if the network propagation delay time is sufficiently short, real-time moving image transmission with a delay time shorter than a frame interval can be provided.

SUMMARY OF THE INVENTION

The inter-frame system can achieve high error resistance, but there has been a possibility that an increased bandwidth may be necessary for transmission. In general communication lines, it is therefore necessary to save the most available bandwidth of the communication line for the transmission of image data (i.e., encoded data). Accordingly, it may be difficult to transmit, for example, redundant codes for error correction and other control signals at the same time with the image data. In other words, it has been necessary to sacrifice image quality in order to transmit the redundant code for error correction and other control signals at the same time.

It is therefore desirable to reduce a bandwidth necessary for transmission by suitably selecting and discarding a part of transmission data at a transmitter side, while controlling image quality deterioration in transmitting the image data.

An embodiment of the invention is an information processor, which includes: an analyzer configured to analyze image data, obtain similarity between the image data, which is to be processed, and reference image data and determine whether or not the image data and the reference image data are similar to each other depending on whether or not the similarity reaches a predetermined threshold; an encoder configured to encode the image data; a discarding section configured to discard the image data if it is determined, as a result of the analysis by the analyzer, that the image data is similar to the reference image data; and a transmitter configured to transmit encoded data generated from the image data encoded by the encoder if it is determined, as a result of the analysis by the analyzer, that the image data is not similar to the reference image data.

The reference image data may be processed before the image data, which is to be processed.

A storage unit configured to store processed image data may be further included. The analyzer may acquire image data processed before the image data, which is to be processed, and stored in the storage unit and analyzes what using the acquired image data as the reference data.

If the image data is discarded by the discarding section, the encoder may increase the amount of code of the encoded data generated through the encoding.

A redundancy encoder configured to perform redundancy encoding with respect to the encoded data generated through encoding the image data by the encoder and generate redundant data may further be included.

If the image data is similar to the reference image data, the transmitter may transmit the redundant data generated by the redundancy encoder.

Another embodiment of the invention is an information processing method for an information processor which processes image data. The method includes the steps of: by an analyzer, analyzing image data, obtaining similarity between the image data, which is to be processed, and reference image data and determining whether or not the image data and the reference image data are similar to each other depending on whether or not the similarity reaches a predetermined threshold; by an encoder, encoding the image data; by a discarding section, discarding the image data if it is determined, as a result of the analysis, that the image data is similar to the reference image data; and by a transmitter, transmitting encoded data generated from the image data encoded by the encoder if it is determined, as a result of the analysis, that the image data is not similar to the reference image data.

In the invention, image data is analyzed to determine similarity between the to-be-processed image data and reference image data, it is then determined whether the image data is similar to the reference image data on the basis whether the similarity reaches a predetermined threshold, the image data is encoded, the image data is discarded if the image data is similar to the reference image data as a result of the analysis, and the encoded data generated by encoding the image data is transmitted if the image data is not similar to the reference image data in accordance with analysis.

According to the embodiments of the invention, data transmission is provided. In particular, the embodiments of the invention reduce a bandwidth necessary for transmission while avoiding image quality deterioration in the image data transmission.

BRIEF DESCRIPTION OF THE DRAWINGS

FIG. 20 is a block diagram of a main exemplary configuration of a personal computer to which an embodiment of the invention is applied.

DESCRIPTION OF THE PREFERRED EMBODIMENTS

Hereinafter, the best mode for implementing the invention (hereinafter, referred to as an "embodiment") will be described. Description will be given in the following order.

1. First Embodiment (Network system: an example in which transmission data is selectively discarded)
2. Second Embodiment (Network system: an example in which the amount of code is increased)
3. Third Embodiment (Network system: an example in which redundancy is increased)
4. Fourth Embodiment (Network system: an example in which a concealment header is used)

1. First Embodiment

Exemplary Configuration of Network System

Figure 1:
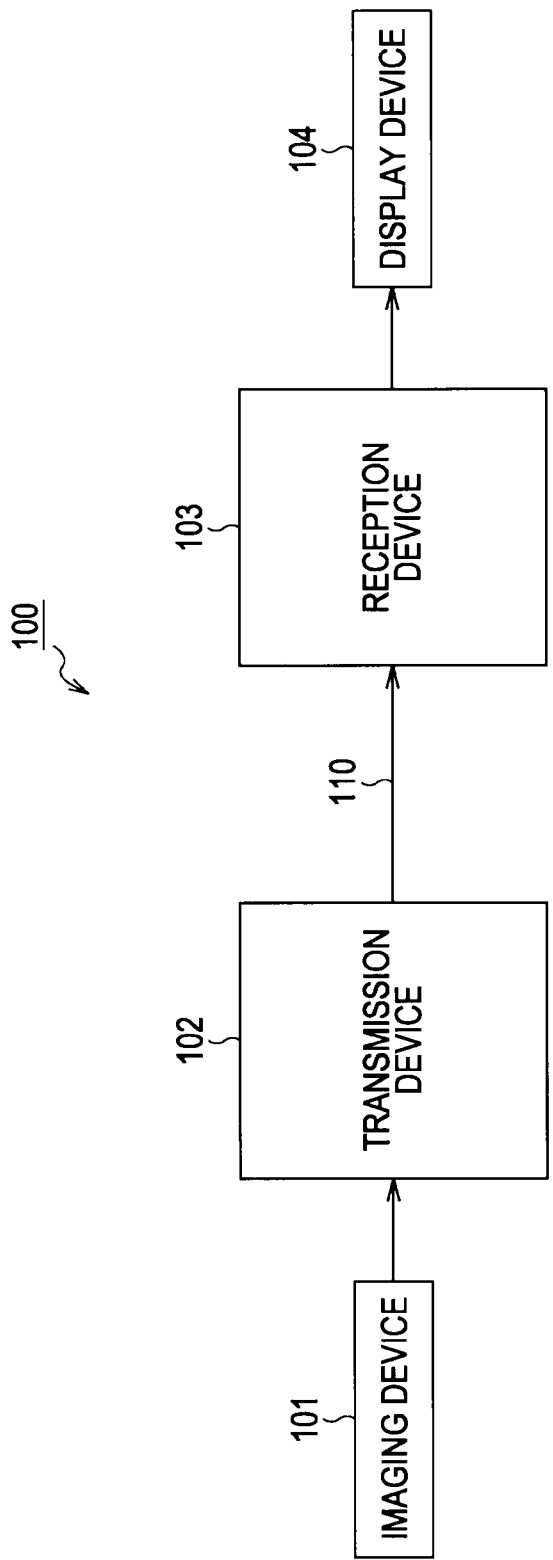
FIG. 1 is a block diagram of a main exemplary configuration of a network system to which an embodiment of the invention is applied.

FIG. 1 is a block diagram of an exemplary configuration of a network system to which the invention is applied. In FIG. 1, a network system 100 includes an image capturing device 101, a transmission device 102, a reception device 103 and a display device 104. The network system 100 transmits moving image data with a short delay time from the image capturing device 101 to the display device 104. In the network system 100, the image capturing device 101 captures an image of an object and generates moving image data. The transmission device 102 transmits the moving image data obtained by the image capturing device 101. The reception device 103 receives the moving image data via the network 110. The display device 104 reproduces and displays the moving image of the received moving image data.

That is, the image captured by the image capturing device 101 is displayed on the display device 104. Accordingly, it is desirable that the time (i.e., delay time) from when the image capturing device 101 captures an image of an image and generates moving image data until the display device 102 acquires the moving image data and reproduces the image data to display the moving image is short.

To address this requirement, the transmission device 102 and the reception device 103 encode and decode the moving image data with a short delay time, and transmit the moving image data in a packetized manner. Even if packet loss occurs during transmission, there is no time to resend the lost packet. The reception device 103 therefore conceals data loss by substituting the lost packet with already received data.

The transmission device 102 expects the error concealment function of the reception device 103 and discards some transmission data. The transmission device 102 selects data that will have the minimum influence upon being discarded. The reception device 103 interpolates the discarded portion.

Exemplary Configurations of Transmission Device and Reception Device

Figure 2:
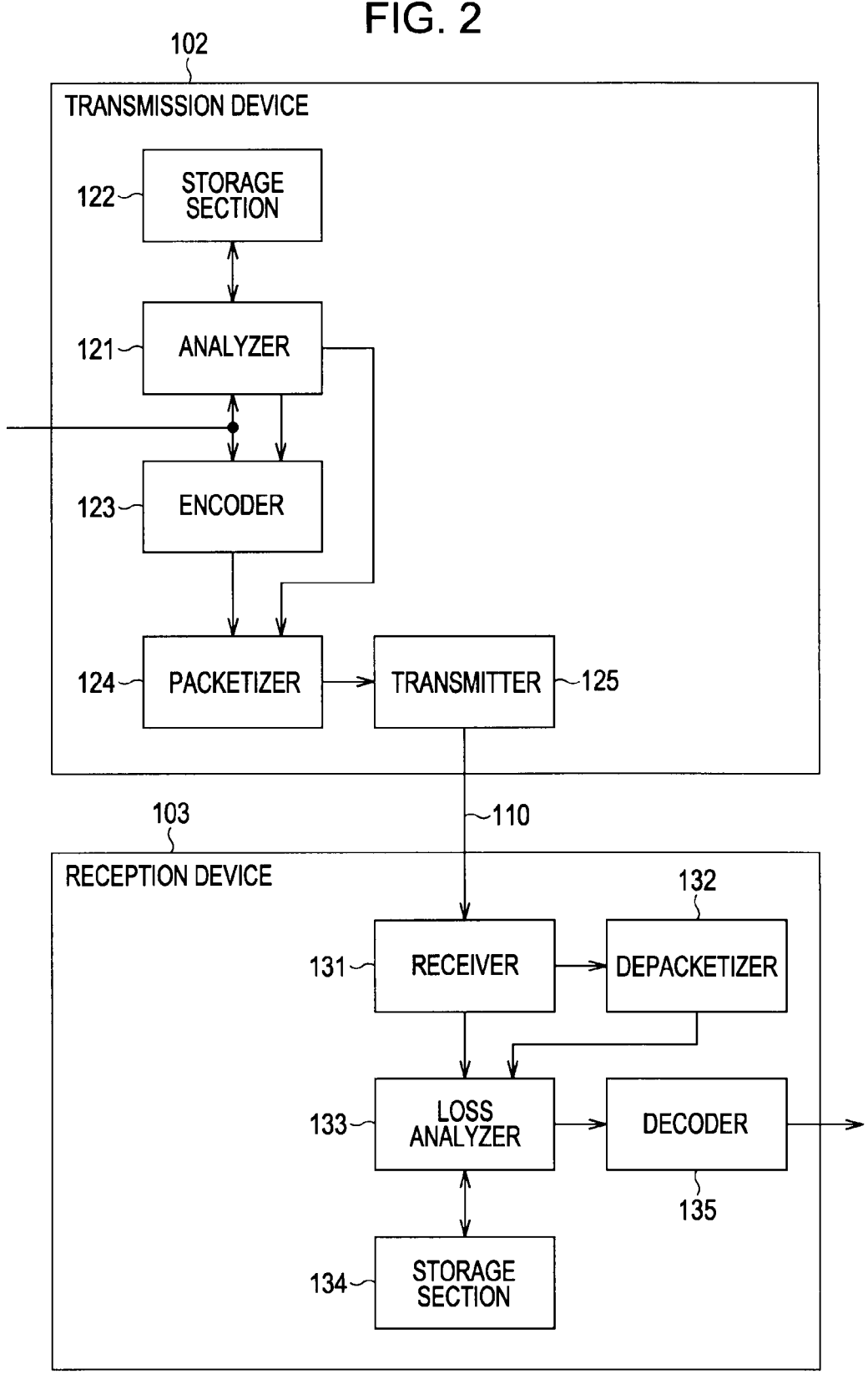
FIG. 2 is a block diagram of exemplary configurations of a transmission device and a reception device.

FIG. 2 is a block diagram illustrating main exemplary internal configurations of the transmission device 102 and the reception device 103 illustrated in FIG. 1.

As illustrated in FIG. 2, the transmission device 102 includes an analyzer 121, a storage section 122, an encoder 123, a packetizer 124 and a transmitter 125.

Moving image data captured by the image capturing device 101 is supplied to the analyzer 121 and the encoder 123 of the transmission device 102. The moving image data is sequentially supplied to the transmission device 102 as generated. That is, in the moving image data, each picture is supplied in time series. In each picture, each line is supplied from the top to the bottom of the image. In each line, each pixel is supplied from the left to the right of the image.

Each component of the transmission device 102 processes the input image data in a unit of a precinct (also referred to as line block or slice) which includes plural lines. The precinct will be described in detail later.

The analyzer 121 analyzes a feature of the image data in order to determine portions to be discarded of the supplied image data. For example, the analyzer 121 obtains similarity between the current image and the reference image through comparison of an image in the most recently input precinct, which is the current to-be-processed image (hereinafter, referred to as "the current image"), to a predetermined image as a reference. Examples of the reference image include an image in a precinct that was input before the current image and was a to-be-processed image previously (hereinafter, referred to as "the previous image".) Hereinafter, description will be given with the previous image being the reference image.

The analyzer 121 reads the previous image corresponding to the current image from the storage section 122 for comparison. After the current image is analyzed, the analyzer 121 supplies the current image to the storage section 122, where the current image is stored as a previous image with respect to the future current image.

The storage section 122 is a storage area including, for example, an arbitrary storage medium, such as a hard disk or a semiconductor memory, which stores the previous image. If the storage area of the storage section 122 is sufficiently large, the storage section 122 may store all the previous images. If the storage area of the storage section 122 is limited, the storage section 122 may eliminate images that are not or less likely used by the analyzer 121.

The analyzer 121 reads, as the previous image, an image in a precinct at a predetermined relative position with respect to the precinct of the current image being used as a reference from the storage section 122.

A previous image with respect to a certain current image may, for example, be an image in the precinct adjacent to the precinct of the current image (i.e., an image in the precinct immediately before the precinct of the current image). The previous image may also be an image in a precinct neighboring the precinct of the current image (i.e., an image in a precinct before several precincts with respect to the precinct of the current image). Further, the previous image may be an image in a precinct of a picture immediately before the picture of the current image located at the same position as the precinct of the current image.

The relative position of the previous image with respect to the current image is arbitrarily determined so long as the previous image is input before the current image. An image in another precinct may also be used as the previous image. Plural previous images may be provided. That is, plural relative positions used as the previous images may be provided. In any case, images stored in the storage section 122 are no longer used as the previous image (i.e., the likelihood of being used as the previous image decreases). The storage section 122 may delete the images in such precincts preferentially.

The analyzer 121 compares the obtained similarity with a predetermined threshold and determines whether or not the current image is similar to the previous image. The analyzer 121 supplies an analysis result to the packetizer 124.

The encoder 123 carries out compression encoding of the input current image by the inter-frame system. Any methods of the inter-frame system may be employed herein. In the description below, the encoder 123 carries out the compression encoding by a method in which wavelet transformation and entropy encoding with less image quality deterioration are employed. In order to achieve data transmission with a short delay time, the encoder 123 carries out the compression encoding with a precinct as a processing unit.

The encoder 123 carries out the compression encoding of the image data, generates encoded data and supplies the encoded data to the packetizer 124.

The packetizer 124 discards the supplied encoded data on the basis of the analysis result of the analyzer 121. If the current image is similar to the previous image, for example, the packetizer 124 discards the encoded data corresponding to the current image. If the current image is not similar to the previous image, the packetizer 124 packetizes the encoded data corresponding to the current image and generates redundant packet for error correction (i.e., redundant data) regarding the obtained packet. The packetizer 124 then supplies the generated redundant packet and the packet of the encoded data to the transmitter 125, which transmits the encoded data to a reception device 103.

The transmitter 125 transmits the packet supplied from the packetizer 124 to the reception device 103 via the network 110.

As described above, the transmission device 101 discards the encoded data of an image similar to those processed in the past so as to reduce the amount of data to be transmitted to the reception device 103 and reduce the volume of transmission data.

The reception device 103 receives the packet transmitted from the transmission device 102 as described above. The reception device 103 has the function of concealing packet loss by compensating for the precinct having packet loss with the encoded data of the previous image. As illustrated in FIG. 2, the reception device 103 includes a receiver 131, a depacketizer 132, a loss analyzer 133, a storage section 134 and a decoder 135. Each component of the reception device 103 carries out processes with a precinct as a processing unit.

The receiver 131 receives the packet transmitted via the network 110 and supplies the received packet to the depacketizer 132.

The depacketizer 132 depacketizes the supplied packet, extracts the encoded data and supplies the extracted encoded data to the loss analyzer 133. If, however, all the packets of the precinct to be processed have not been provided yet, the depacketizer 132 restores the lost packet using the redundant data if the lost packet is restorable. The depacketizer 132 then depacketizes the received packet and the restored packet, extracts the encoded data and supplies the extracted encoded data to the loss analyzer 133.

If a large number of lost packets (i.e., the amount of lost encoded data) are not restorable, then the depacketizer 132 omits restoration of the lost packets. The depacketizer 132 depacketizes only the received packet, extracts the encoded data and supplies the extracted encoded data to the loss analyzer 133. In this case, the depacketizer 132 supplies the encoded data to the loss analyzer 133 with the encoded data being lost partially or entirely. When unrestorable packet loss occurs, especially when all the encoded data is lost, it suffices that the depacketizer 132 notifies the fact to the loss analyzer 133.

If all encoded data in the precinct to be processed is supplied to the loss analyzer 133, the loss analyzer 133 supplies the encoded data to the decoder 135.

If the encoded data in the precinct to be processed have not been provided yet, the loss analyzer 133 reads, from the storage section 134, the encoded data without data loss of the previous image corresponding to the current image which is the image in the precinct to be processed, replaces the defective data with the read encoded data of the current image and supplies the replaced data to the decoder 135. That is, the loss analyzer 133 performs data compensation using data of the previous image.

If the data is not compensated for, the loss analyzer 133 supplies the encoded data without data loss supplied from the depacketizer 132 to the storage section 134. The storage section 134 stores the supplied encoded data.

The storage section 134 is a storage area configured by, for example, any storage medium, such as a hard disk or a semiconductor memory, which stores the encoded data of the previous image. The encoded data of all the previous images may be stored if the storage area of the storage section 134 is sufficiently large. If the storage area of the storage section 134 is limited, the storage section 134 preferentially deletes the encoded data that are not being used any more, or not likely to be used, by the loss analyzer 133.

The loss analyzer 133 uses, as the previous image, the image in the precinct at the predetermined relative position on the basis of the precinct of the current image which is the image of the encoded data supplied from the depacketizer, reads the encoded data of the previous image from the storage section 122 and uses the read encoded data for data compensation.

The decoder 135 decodes the encoded data supplied from the loss analyzer 133 by a method corresponding to the encoding method of the encoder 123 and generates image data. The decoder 135 supplies the generated image data to a display device 104.

Exemplary Configuration of Transmission Device

Figure 3:
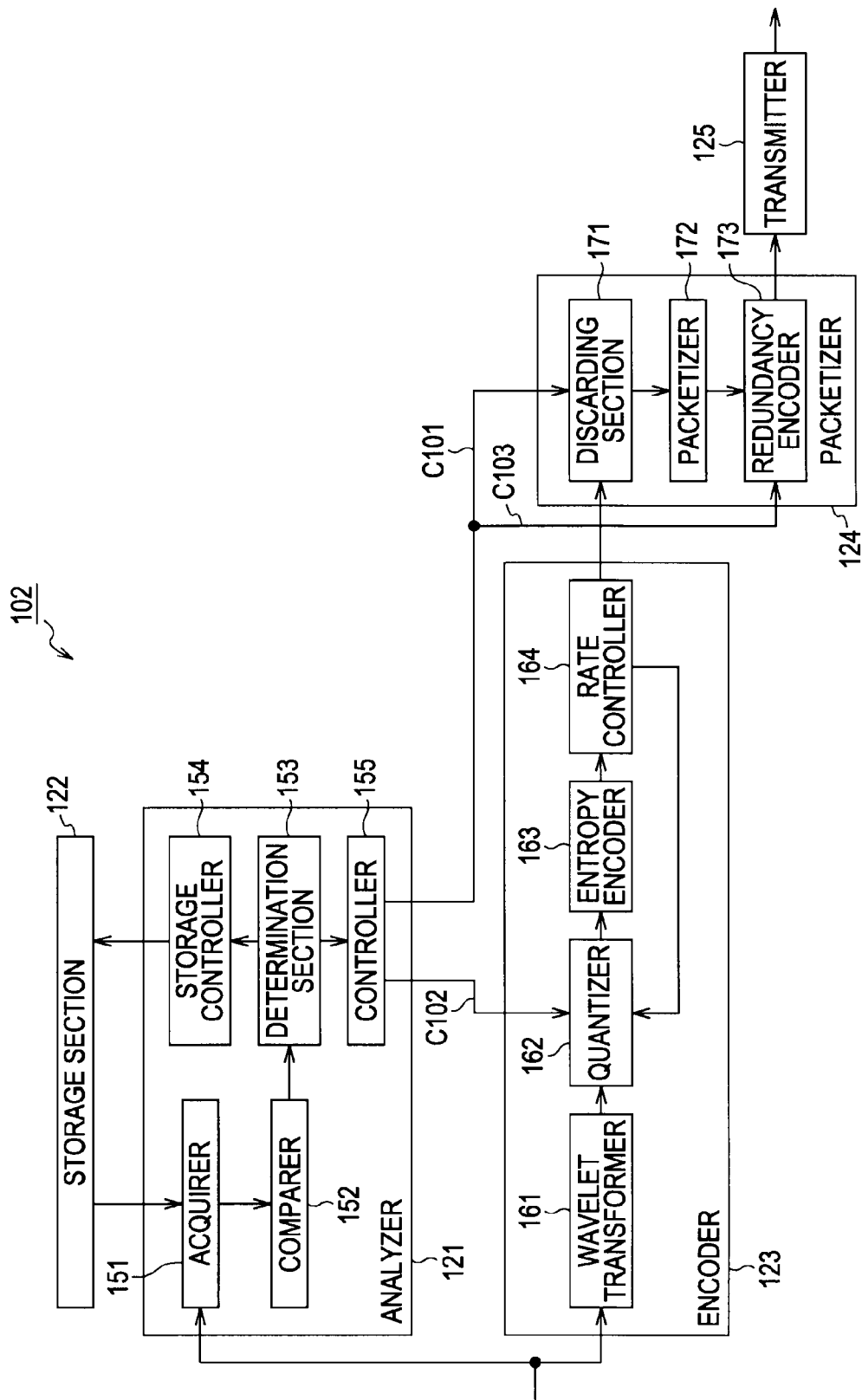
FIG. 3 is a more detailed block diagram of an exemplary configuration of the transmission device.

Next, the transmission device 102 will be described. FIG. 3 is a detailed block diagram illustrating an exemplary internal configuration of the transmission device 102.

As illustrated in FIG. 3, the analyzer 121 includes an acquiring section 151, a comparing section 152, a determination section 153, a storage controller 154, a determination section 154 and a controller 155.

The acquiring section 151 acquires image data of the current image supplied from the image capturing device 101. The acquiring section 151 acquires image data of the previous image corresponding to the current image from the storage section 122. The acquiring section 151 supplies the image data to the comparing section 152.

The comparing section 152 compares moving image data of the current image supplied from the acquiring section 151 and image data of the previous image. For example, the comparing section 152 compares pixel values of pixels at corresponding positions of the current image and the previous image and calculates a peak signal-to-noise ratio (PSNR) as a difference value. The comparing section 152 then supplies the difference value to the determination section 153 along with the image data of the current image and the previous image.

Upon reception of the data, the determination section 153 compares the difference value with a predetermined threshold and determines whether or not the current image and the previous image are similar to each other. The determination section 153 supplies the determination result to the controller 155.

The controller 155 supplies the determination result to the discarding section 171 of the packetizer 124 (C101).

The determination section 153 supplies the image data of the current image to the storage controller 154. The storage controller 154 supplies the data supplied from the determination section 153 to the storage section 122. The storage section 122 stores the received data. The image data stored in the storage section 122 is appropriately used as a previous image with respect to the subsequent current image.

The encoder 123 has a wavelet transformer 161, a quantizer 162, an entropy encoder 163 and a rate controller 164.

The wavelet transformer 161 carries out wavelet transformation of the image data of the precinct to be processed (i.e., the current image). Although described later in detail, the wavelet transformation is a process in which analysis filtering is performed for dividing input data into low-frequency components and high-frequency components along both directions horizontally and vertically with respect to a screen. Through the wavelet transformation process, the input data is divided into four components (i.e., subbands): a horizontally and vertically low-frequency component (LL component); a horizontally high-frequency and vertically low-frequency component (HL component); a horizontally low-frequency and vertically high-frequency component (LH component); and a horizontally and vertically high-frequency component (HH component).

The wavelet transformer 161 recursively repeats the wavelet transformation process for predetermined number of times with respect to the horizontally and vertically low-frequency component (LL component) obtained through the analysis filtering. That is, the image data of the current image is divided into each wavelet coefficient (hereinafter, referred to as "the coefficient") for each of the plural hierarchized subbands (i.e., frequency components). The wavelet transformer 161 supplies the generated coefficient to the quantizer 162.

The quantizer 162 quantizes the coefficient of each component generated by the wavelet transformer 161 by, for example, dividing the coefficient by the quantization step size and generates a quantization coefficient. The quantizer 162 can set up the quantization step size for each precinct. Since the precinct includes the coefficients of all the frequency components of a certain image area, advantageous effects of the multiplex resolution analysis which is characteristic of the wavelet transformation can be utilized if each precinct is quantized. Since it is only necessary to determine the number of precincts with respect to the entire screen, the load of quantization is made small.

The energy of the image signal is usually concentrated around the low-frequency component and has a characteristic that degradation in the low-frequency component is easily recognized visually. It is therefore effective to weigh in quantization so that the value of the quantization step size in the subband of the low-frequency component becomes small as a result. Such weighted quantization causes the relatively large amount of information to be allocated in the low-frequency component and thus subjective image quality of the entire image is improved.

The entropy encoder 163 carries out the information source encoding of the quantization coefficient generated by the quantizer 162 and generates a compressed encoding code stream. Examples of the information source encoding include Huffman coding and further high-precise arithmetic encoding systems used in the JPEG2000 system.

Here, the range of coefficients to be entropy encoded is an extremely important element that is directly related to the compression efficiency. For example, in the JPEG system, information is compressed in the following manner: DCT transformation is performed with respect to 8×8 blocks to generate 64 DCT transformation coefficients; and the DCT transformation coefficients are then subjected to Huffman coding. That is, the 64 DCT transformation coefficients are within a range of entropy encoding.

Unlike the DCT transformation to the 8×8 blocks, the wavelet transformer 161 performs the wavelet transformation per line. The entropy encoder 163 therefore performs information source encoding independently of each bandwidth (i.e., subband) and for each precinct in the each bandwidth. The entropy encoder 163 supplies the generated encoded data to the rate controller 164.

The rate controller 164 controls the rate to be finally adjusted to a target bit rate or a target compression ratio and outputs the encoded data after the rate control to the discarding section 171 of the packetizer 124. In particular, the rate controller 164 transmits a control signal to the quantizer 162 so as to reduce the quantization step size small in order to increase the bit rate and increase the quantization step size in order to decrease the bit rate.

The packetizer 124 includes a discarding section 171, a packetizer 172 and a redundancy encoder 173. The discarding section 171 refers to the comparison result supplied from the controller 155, discards the encoded data of the current image that is similar to the previous image and supplies the rest of the encoded data to the packetizer 172.

The packetizer 172 divides and packetizes the encoded data supplied from the discarding section 171 and supplies the encoded data to the redundancy encoder 173. The redundancy encoder 173 performs the redundancy encoding to the encoded data supplied from the packetizer 172, generates a redundant packet (i.e., redundant data) and supplies the redundant packet to the transmitter 125 along with the packet of encoded data. The transmitter 125 transmits the received packets. The redundancy encoding process may be omitted. If the redundancy encoder 173 is omitted, the encoded data packetized in the packetizer 172 is supplied to the transmitter 125 as it is and is transmitted.

Wavelet Transformation

Next, the wavelet transformation performed by the wavelet transformer 161 illustrated in FIG. 3 will be described.

As described above, the wavelet transformation is a process which performs analysis filtering for dividing input data into low-frequency components and high-frequency components along both directions horizontal and vertical with respect to a screen. Through the wavelet transformation process, the input data is divided into four components (i.e., subbands): a horizontally and vertically low-frequency component (LL component); a horizontally high-frequency and vertically low-frequency component (HL component); a horizontally low-frequency and vertically high-frequency component (LH component); and a horizontally and vertically high-frequency component (HH component).

The wavelet transformer 161 recursively repeats the wavelet transformation process for predetermined times with respect to the horizontally and vertically low-frequency component (LL component) obtained through the analysis filtering. That is, each picture in the moving image data is divided into a coefficient for each of the plural hierarchized subbands (i.e., frequency components).

Figure 4:
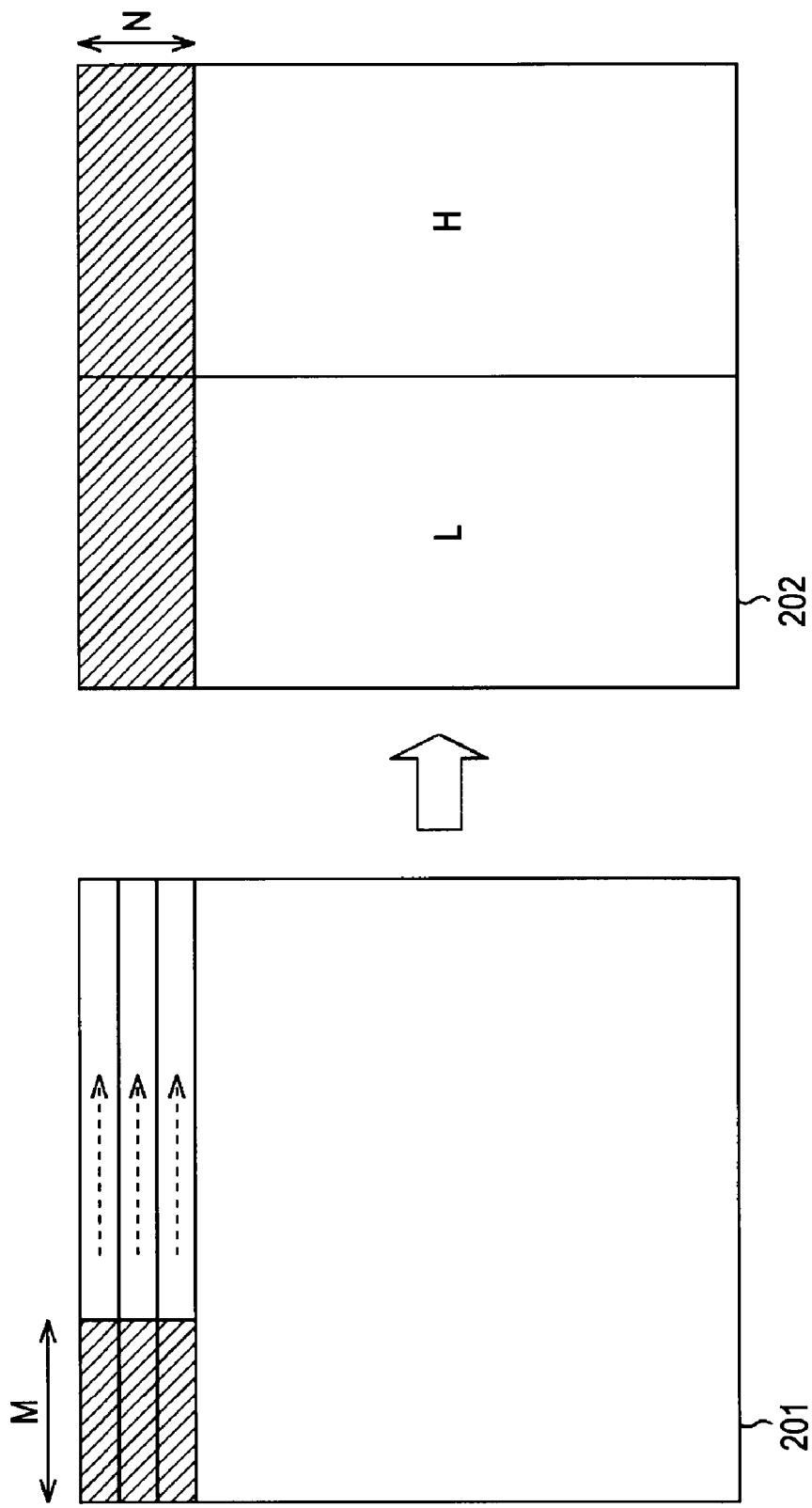
FIG. 4 schematically illustrates analysis filtering.

The wavelet transformer 161 obtains data of a necessary number of samples and performs analysis filtering along the horizontal direction of the image with respect to the image data for each picture input as a sample (a column) for each line from the left to the right of the image. That is, whenever the wavelet transformer 161 obtains the data of a necessary number of samples for implementing analysis filtering, the wavelet transformer 161 performs horizontal analysis filtering. For example, the wavelet transformer 161 performs horizontal analysis filtering with respect to the image data 201 of the baseband illustrated in the left of FIG. 4 whenever M columns are input and divides the image data 201 into a horizontally low-frequency component (L) and a high-frequency component (H) for each line. The hatched area of the horizontal analysis filtering processing result 202 illustrated in the right of FIG. 4 represents the coefficients for N lines divided into the horizontally low-frequency component (L) and the high-frequency component (H) by the wavelet transformer 161.

When the horizontal analysis filtering processing result 202 for the predetermined number of lines (N lines) is generated, the wavelet transformer 161 performs analysis filtering (i.e., vertical analysis filtering) along the vertical direction. N represents a natural number greater than the number of lines necessary for the wavelet transformer 161 to perform vertical analysis filtering.

Figure 5:
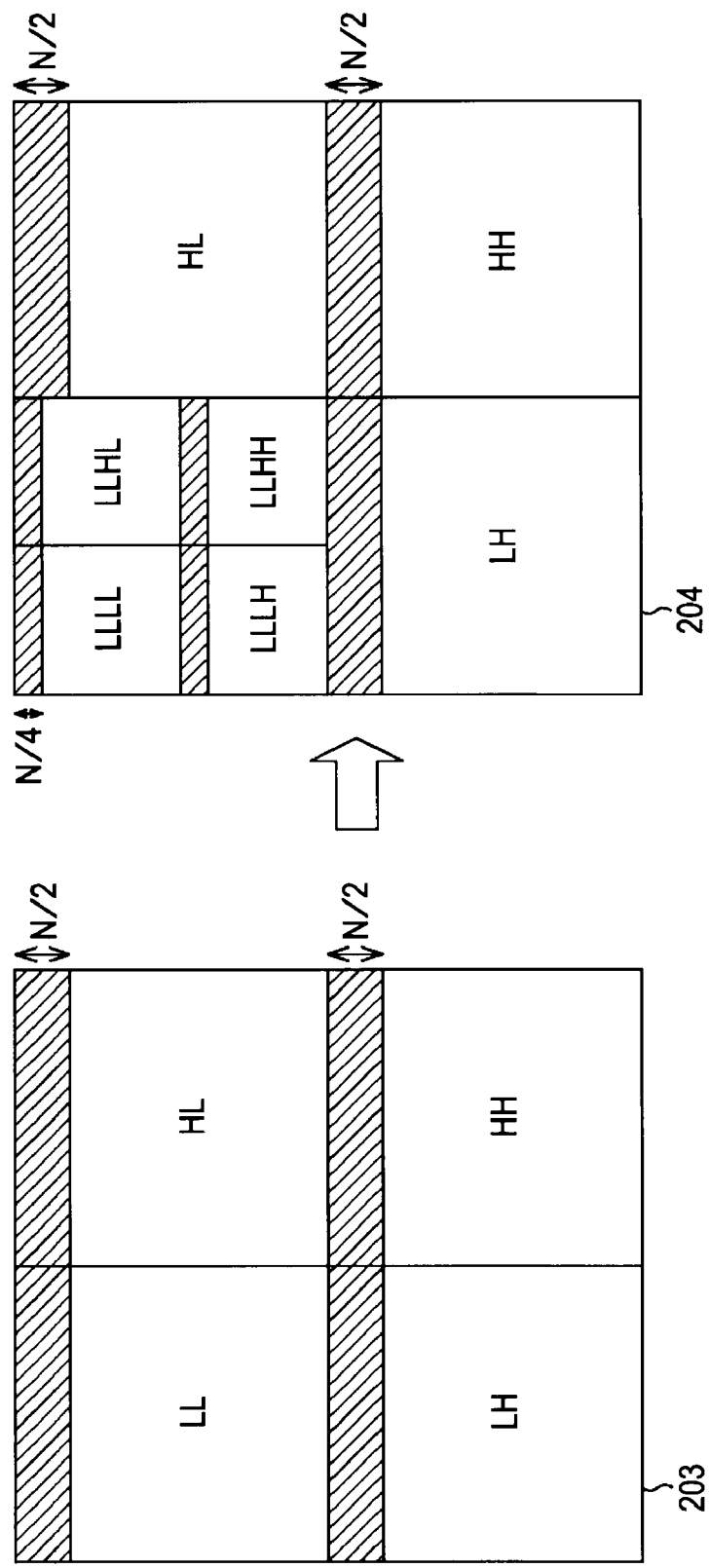
FIG. 5 schematically illustrates analysis filtering following FIG. 4.

The wavelet transformer 161 performs vertical analysis filtering for each column with respect to each component of the horizontal analysis filtering processing result 202 for the generated N lines. When the vertical analysis filtering is repeated for each of the N lines, the coefficient of each component of the horizontal analysis filtering processing result 202 is divided into the coefficient of the vertical low-frequency component and the coefficient of the horizontally high-frequency component as illustrated in the left of FIG. 5.

That is, the horizontally low-frequency component (L) is divided into a horizontally and vertically low-frequency component (LL component) and a horizontally low-frequency and vertically high-frequency component (LH component). The horizontally high-frequency component is divided into a horizontally high-frequency and vertically low-frequency component (HL component) and a horizontally and vertically high-frequency component (HH component). That is, the horizontal analysis filtering processing result 202 is divided into the coefficients of four components (coefficient 203).

The wavelet transformer 161 recursively repeats the above-described horizontal analysis filtering and vertical analysis filtering with respect to the coefficient of the LL component. That is, the HL component, the LH component and the HH component are output outside as the processing results among the result of the obtained analysis filtering until the coefficient of the predetermined hierarchy (i.e., division level) is obtained. The remaining LL component is again subject to analysis filtering by the wavelet transformer 161.

For example, the coefficient 203 illustrated in the left of FIG. 4 is converted into the coefficient 204 illustrated in the right of FIG. 4. In the coefficient 204, analysis filtering is carried out again and the LL component is divided into an LLLL component, an LLHL component, an LLLH component and an LLHH component. If the division level does not reach the predetermined hierarchy, the wavelet transformer 161 performs analysis filtering again to the newly generated LLLL component.

Figure 6:
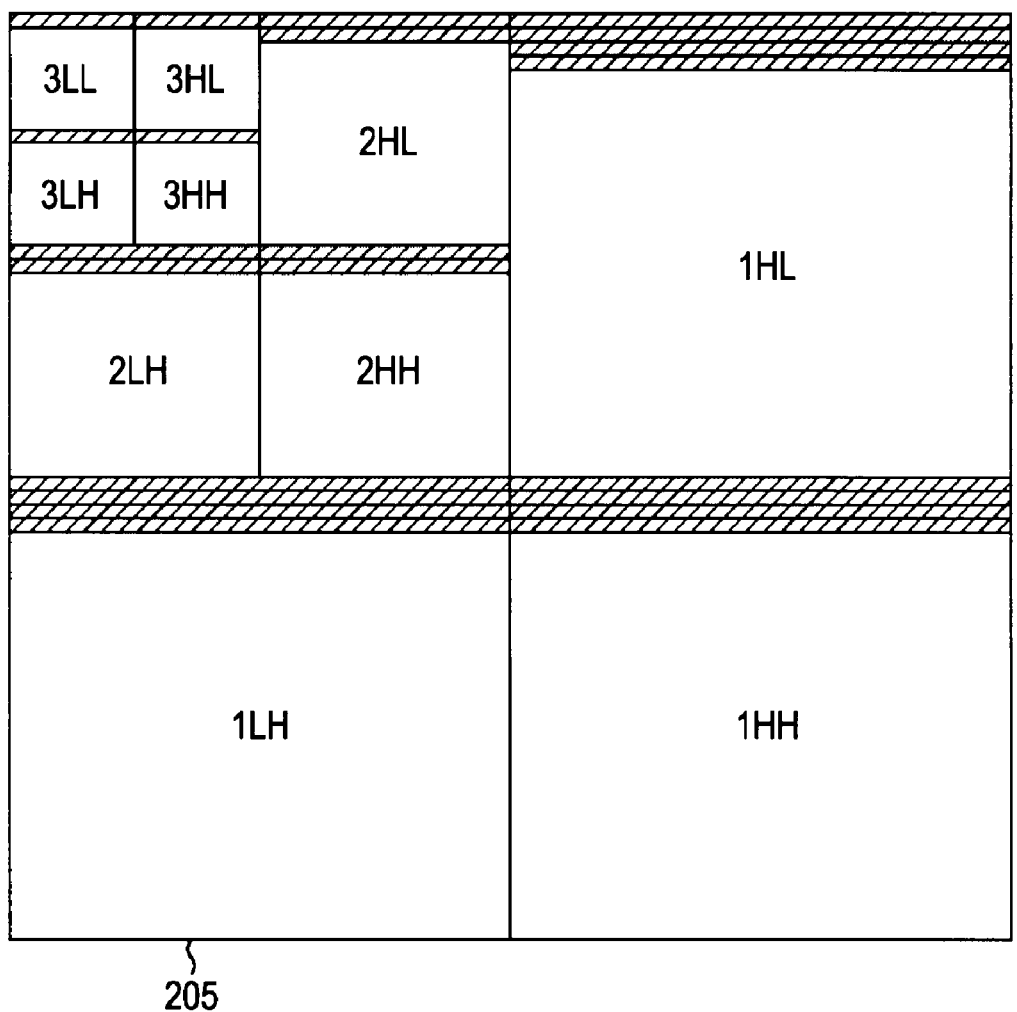
FIG. 6 illustrates analysis filtering result.

The wavelet transformer 161 recursively repeats the analysis filtering for predetermined times and divides the moving image data into desired division levels. FIG. 6 illustrates an exemplary coefficient when the moving image data is divided into a division level 3 (hierarchy 3). In FIG. 6, the coefficient 205 divided to the division level 3 is divided into 10 subbands hierarchized into 3 levels.

In FIG. 6, three subbands of a 1HL component, a 1LH component and a 1HH component are at a first division level into which the image data of the baseband is divided. Three subbands of a 2HL component, a 2LH component and a 2HH component are at a second division level into which the 1LL component of the first division level is divided. Four subbands of a 3LL component, a 3HL component, a 3LH component and a 3HH component are at a third division level into which the 2LL component of the second division level is divided.

In the wavelet transformation process, every time the filtering is carried out (i.e., whenever the hierarchy goes down), the number of generated lines is reduced by one n-th, wherein n is the exponential of 2. For example, as in the examples illustrated in FIGS. 4 and 5, analysis filtering is carried out with respect to the image data of the N-lined baseband to divide the image data into four-component coefficients of 2/N (see the coefficient 203 in the left of FIG. 5). The LL component is divided into four-component coefficients of 4/N as the coefficient 204 illustrated in the right of FIG. 5 when being subject to repeated analysis filtering.

As described above, every time the analysis filtering is carried out, the number of generated lines is reduced by one n-th, wherein n is the exponential of 2. That is, the number of lines of the baseband necessary for generating a line of the coefficient at the last division level is determined by the time the filtering process is repeated (i.e., the number of hierarchical orderings at the last division level). Since the number of hierarchical orderings is usually determined in advance, the number of baseband lines necessary to generate a line of a coefficient at the last division level is also determined accordingly. For example, if the last division level is 3 as in the example illustrated in FIG. 6, the number of baseband lines of the image data necessary to generate a line of a coefficient at the last division level is 8.

The amount of image data of the baseband necessary to generate a line of a coefficient at the last division level (i.e., the amount of image data corresponding to two or more lines) or the coefficients on each hierarchical ordering is collectively called a "precinct" (or a line block).

The hatched areas in FIG. 6 are a coefficient which forms a precinct. In the example of FIG. 6, the precinct is configured by the coefficient corresponding to a line of each component at the third division level, the coefficient corresponding to two lines of each component at the second division level and the coefficient corresponding to four lines of each component at the third division level. Note that the image data before being subject to analysis filtering corresponding to the coefficients described above, i.e., image data corresponding to eight lines in this example, is also called a "precinct" (or a line block).

The analysis filtering can be operated in an arbitrary method. For example, a convolution operation can be employed in which the tap coefficient of the filter is subject to convolution multiplication by the actual input data. If the tap length is long, however, there is a possibility that calculation load may be increased accordingly. In order to reduce the operation load, a lifting operation using, for example, a 9×7 analysis filter may be employed instead of the convolution operation.

The coefficients divided into the plural subbands as described above are encoded for each subband (i.e., for each predetermined number of lines) in the entropy encoder 163.

Exemplary Configuration of Decoder

Figure 7:
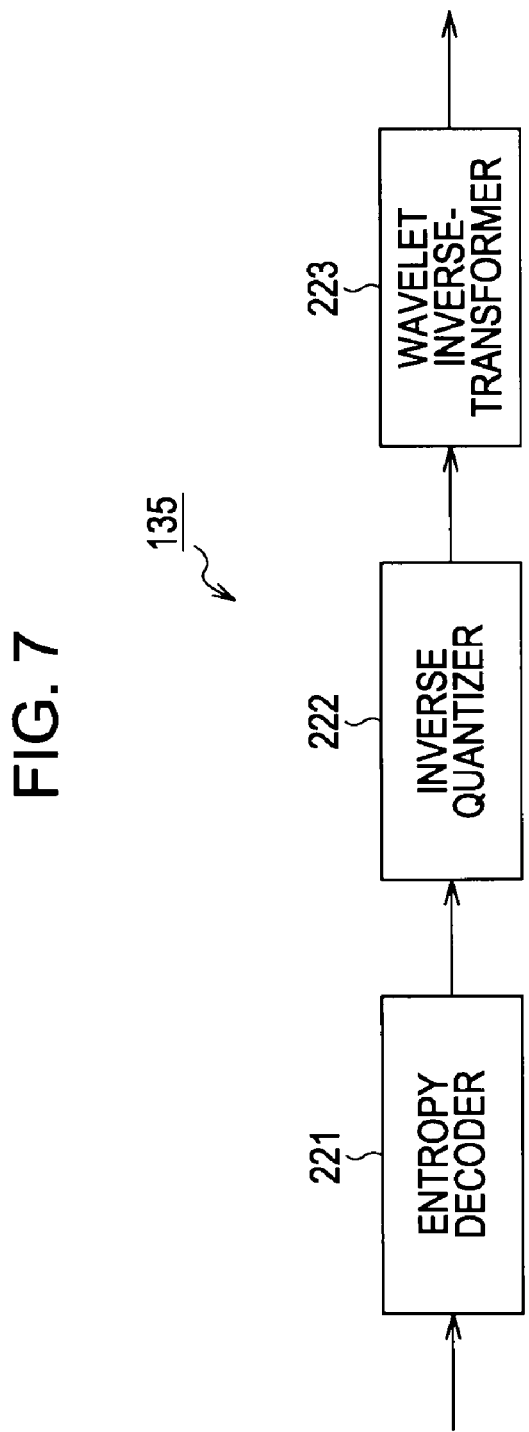
FIG. 7 is a block diagram of an exemplary configuration of a decoder.

The thus-encoded data is then decoded in the decoder 135 of the reception device 103. FIG. 7 is a block diagram of an exemplary internal configuration of the decoder 135.

As illustrated in FIG. 7, the decoder 135 includes an entropy decoder 221, an inverse quantizer 222 and a wavelet inverse-transformer 223.

The entropy decoder 221 carries out information source decoding of the input encoded data and generates quantization coefficient data. Examples of the information source decoding include the Huffman decoding and highly efficient arithmetic decoding, corresponding to the information source encoding of the entropy encoder 163. If the information source encoding is carried out for every P lines in the entropy encoder 163, the information source decoding in the entropy decoder 221 is carried out for every P lines independently for each subband.

The inverse quantizer 222 multiplies the quantization coefficient data by the quantization step size to carry out inverse quantization and generates the coefficient data. The quantization step size is usually described in, for example, a header of the encoding code stream. If the quantization step size is set up for each line block in the quantizer 162, the inverse quantization step size is similarly set up for each line block to carry out inverse quantization in the inverse quantizer 222.

The wavelet inverse-transformer 223 performs an inverse process of the wavelet transformer 161. That is, the wavelet inverse-transformer 223 performs filtering (i.e., synthesis filtering) for synthesizing the low-frequency component and the high-frequency component with respect to the coefficient data divided into the plural bandwidth by the wavelet transformer 161 along both the horizontal and vertical directions.

Since filtering can be efficiently performed corresponding to the analysis filtering when lifting technique described above is applied, it is preferable that the lifting technique can be applied similarly to the synthetic filtering of the wavelet inverse transformation.

Image Compensation

As described with reference to FIG. 2, when unrestorable data loss occurs in the encoded data, the loss analyzer 133 causes the decoder 135 to decode the encoded data of the previous image instead of the encoded data. That is, the loss analyzer 133 compensates for the defect in the encoded data with the encoded data of the previous image.

Any compensation process may be employed. For ease of illustration, the loss analyzer 133 performs data compensation in a precinct unit which is the processing unit of the decoding in the following description. That is, if the encoded data of the to-be-processed precinct acquired from the depacketizer 132 has even a partial defect, the loss analyzer 133 discards all the encoded data of the precinct, reads the encoded data (corresponding to one precinct) of the previous image from the storage section 134 and supplies the read encoded data to the decoder 135.

The precinct in which image is used as the previous image can be located arbitrarily. For example, an image in a precinct located in a spatial position similar to that of the precinct of the current image may be used as the previous image. An image in a precinct in the same picture as that of the current image adjacent to the precinct of the current image may be used as the previous image. Further, an image in a precinct neighboring the precinct of the current image may also be used as the previous image.

In particular, an image in a precinct located immediately above the precinct of the current image of the same picture as the current image may be used as a previous image. An image in a precinct located several precincts above the precinct of the current image of the same picture as the current image may be used as a previous image.

Figure 8:
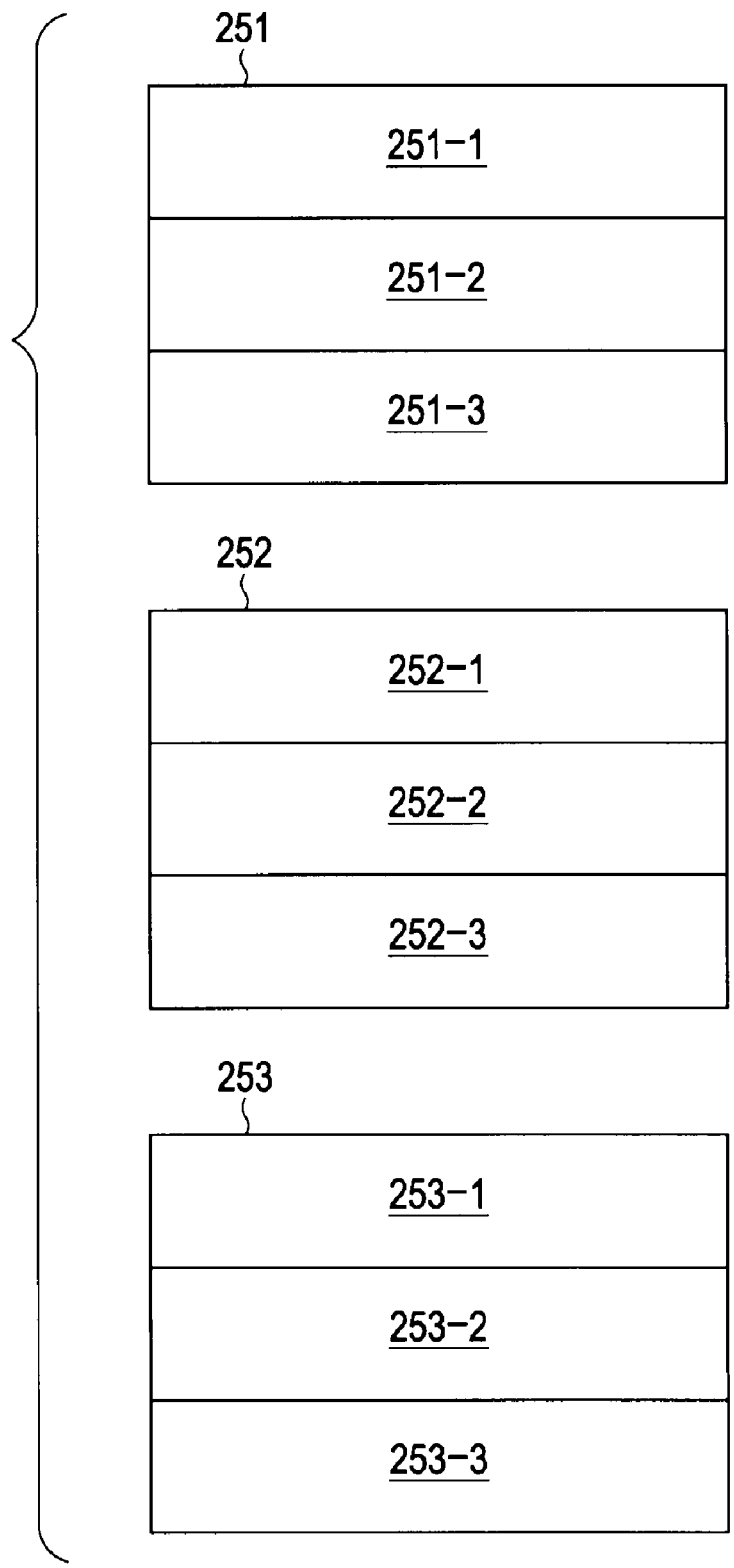
FIG. 8 illustrates an exemplary previous image.

FIG. 8 illustrates an exemplary arrangement of the precincts of plural pictures. In FIG. 8, the pictures 251, 252 and 253 are continuous to each other along the temporal axis, and are arranged in this order. Each picture is divided into three precincts (i.e., three line blocks or slices). In practice, the number of the precincts per one picture can be arbitrarily determined.

In this case, for example, a precinct 253-3 is considered as a to-be-processed precinct and the image therein is considered as the current image. Then, images in precincts 253-1 and 253-2 are set as previous images.

An image in a precinct located at a position temporally similar to that of the precinct of the current image may also be used as the previous image. In particular, an image in a precinct located at the same position as the precinct of the current image of an immediately previous picture, or an image in a precinct located at the same position as the precinct of the current image previous to the current picture by several pictures may be used as a previous image.

In the example of FIG. 8, an image in the precinct 252-3 of the picture 252 and an image in the precinct 251-3 of the picture 251 are set as a previous image with respect to the precinct 253-3 of the current image.

The relative position of the precinct used as the previous image with respect to the precinct of the current image may be arbitrarily determined. Other precincts than those described may also be used. Plural previous images may be prepared with respect to each current image and any one of the previous images may be selected suitably.

The relative position of the previous image in the reception device 103 is independently determined with respect to the transmission device 101. It is therefore unnecessary that the previous image used by the loss analyzer 133 for data compensation corresponds to the previous image used by the analyzer 121 for the comparison.

Process Flow

Next, an exemplary flow of the process performed by each processing section will be described. First, an exemplary flow of the transmission process performed by the transmission device 101 will be described with reference to the flowchart of FIG. 9.

When image data is input into the transmission device 101 and the transmission process is started, the analyzer 121 performs the analyzing process for analyzing the image of the input image data in the step S101. Details of the analyzing process will be described later. After the analyzing process is completed, the encoder 123 encodes the data of the current image and generates encoded data in step S102.

In step S103, the packetizer 124 determines whether or not the current image and the previous image are similar to each other on the basis of the result of the analyzing process performed in the step S101. If the current image and the previous image are not similar to each other, the routine proceeds to step S104. In step S104, the packetizer 124 packetizes the encoded data of the current image. The generated packet can be subject to redundancy encoding by using, for example, an error-correcting code, such as the Reed-Solomon (RS) code, and generates redundant data (i.e., redundant packet).

In step S105, the transmitter 125 transmits the packet generated by the packetizer 124 to the reception device 103 via the network 110. When the packet is transmitted, the transmission process comes to an end.

If it is determined in step S103 that the current image and the previous image are not similar to each other, the routine proceeds to step S106. In step S106, the packetizer 124 discards the to-be-processed encoded data (of the current image). When the encoded data is discarded, the transmission process comes to an end.

The transmission device 102 repeatedly executes the transmission process each time the image data corresponding to one precinct is input.

As described above, the transmission device 102 analyzes the current image, discards the encoded data of the current image similar to the previous image and transmits only the encoded data of the current image that is similar to the previous image to the reception device 103.

Next, an exemplary flow of the analyzing process performed in the step S101 in FIG. 9 will be described with reference to the flowchart of FIG. 10.

When the analyzing process is started, the acquiring section 151 of the analyzer 121 acquires, from the storage section 122, the previous image corresponding to the current image supplied from the image capturing device 101 in step S121. In step S122, the comparing section 152 compares the current image with the previous image. In step S123, the determination section 153 determines similarity through comparison between difference information of the current image and the previous image which are the results of the comparison in step S122 and a predetermined threshold.

The controller 155 notifies the determination result calculated by the process in step S123 to the discarding section 171 of the packetizer 124 in step S124. In step S125, the storage controller 154 causes the storage section 122 to store data of the current image as the data regarding the previous image. After the process of step S125 is completed, the analyzing process is completed. The routine returns to step S101 in FIG. 9, and the processes after step S102 are performed.

Figure 11:
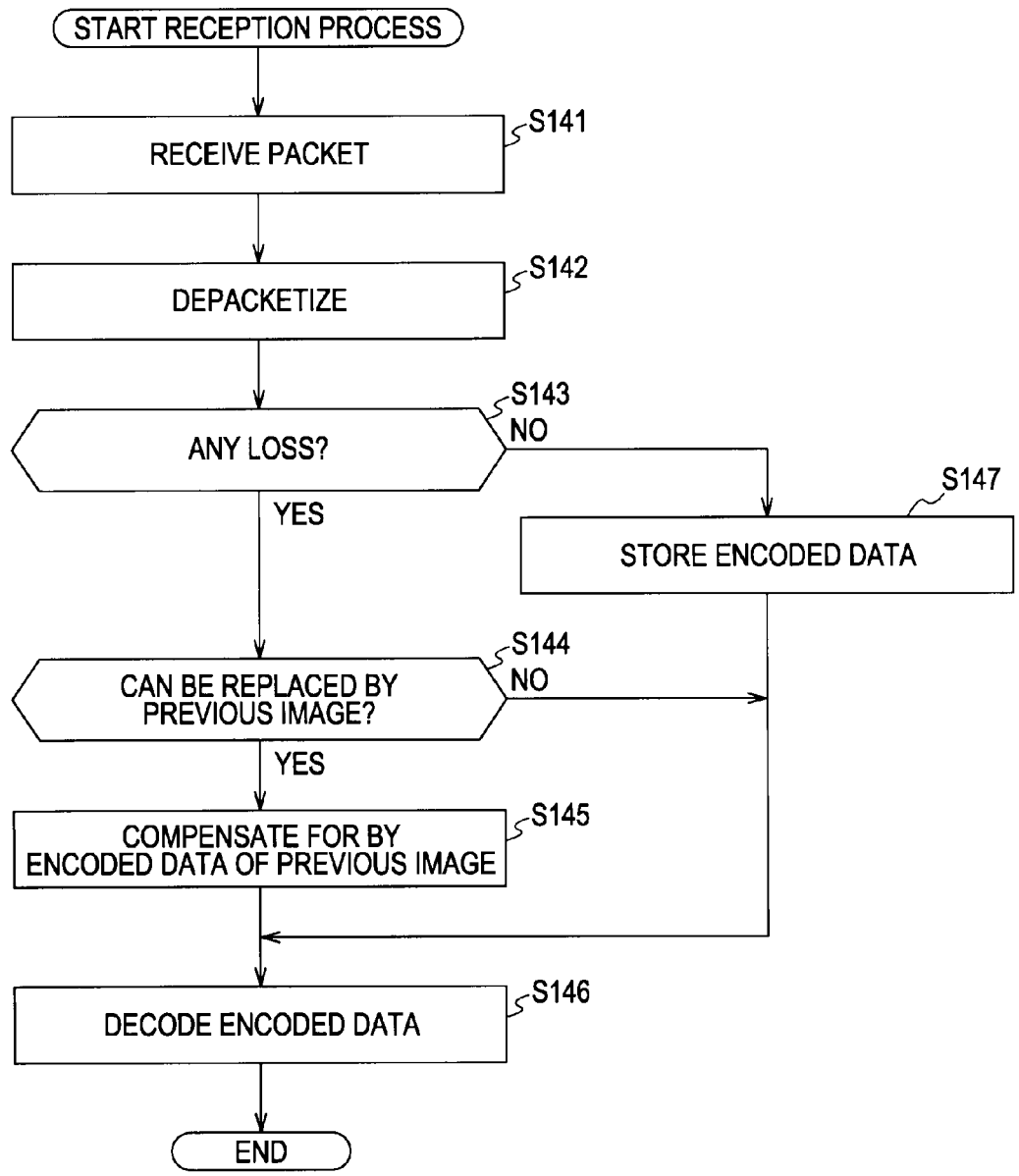
FIG. 11 is a flowchart illustrating an exemplary flow of a reception process.

The transmission device 102 selects data to be discarded through the analyzing process described above. Next, an exemplary flow of the reception process by the reception device 103 which receives the thus-transmitted, partially defected encoded data will be described with reference to the flowchart of FIG. 11.

When the reception process is started, the receiver 131 of the reception device 103 receives a packet in step S141. In step S142, the depacketizer 132 depacketizes the received packet, restores the restorable packet and extracts the encoded data.

In step S143, the loss analyzer 133 determines whether or not there has been data loss. If it is determined that the data has been partially lost, the routine proceeds to step S144. In step S144, the loss analyzer 133 determines whether or not the encoded data of the partially lost current image can be replaced by the previous image.

If it is determined that the replacement can be made, the routine proceeds to step S145. In step S145, the loss analyzer 133 reads the encoded data of the previous image out of the storage section 134 and replaces the lost encoded data of the partially lost current image by the read encoded data of the previous image. In step S146, the decoder 135 decodes encoded data and generates image data. When the process of step S146 is completed, the reception process comes to an end.

If it is determined in step S144 that the replacement by the previous image is not possible, the routine proceeds to step S146 and subsequent processes are performed. If it is determined in step S143 that there has been no data loss, the routine proceeds to step S147.

In step S147, the loss analyzer 133 supplies the encoded data at the precinct unit without a loss to the storage section 134. The storage section 134 stores the supplied encoded data. After the process of step S147 is completed, the process returns to step S146 and subsequent processes are performed.

As described above, the reception device 103 performs data compensation by replacing the encoded data of the previous image with respect to the loss of the unrestorable packet.

If the data is transferred with a short delay time, the codec operating on the line basis is advantageous. The codec, however, has no time saved for re-transmission of data because the codec aims at a short delay time. In practice, however, data loss occurring during transmission is not uncommon. The data loss may significantly impair image quality of the restored image.

It is therefore necessary for the reception device 103 which performs data transmission with a short delay time to have a function to increase image quality of the decoded image. In particular, such a function may include to restore lost data by using redundant data or to replace the lost data by previously transmitted data.

In the codec method aiming at data transmission with a short delay time has difficulty in increasing a compression ratio, and thus often uses the maximum capacity of a communication line for transmission of image data. The codec often has no extra communication band. It is therefore difficult to transmit other data, such as redundant data, during transmission of image data. That is, it is often difficult to increase redundancy of the image data and to provide sufficient restoration.

Accordingly, rather than error correction through redundancy encoding, it is important and inevitable that the reception device 103 has an error concealment function to replace the error by previously transmitted data. The reception device 103 for data transmission with a short delay time usually has such an error concealment function.

The transmission device 102 reduces the bandwidth necessary for data transmission by effectively using the error concealment function of the reception device 103. That is, as described above, the transmission device 102 discards a part of the transmission data (i.e., encoded data in some precincts). The reception device 103 replaces the encoded data in the discarded precinct by previously transmitted data to conceal the error as in the case of the data lost during transmission.

Accordingly, the transmission device 102 can reduce the bandwidth necessary for transmission, while controlling the image quality deterioration of the decoded image in the image data transmission.

As a characteristic of the present embodiment, the algorithm of discarding data by the transmission device 102 does not necessarily correspond to the algorithm of error concealment by the reception device 103. That is, any algorithm can be used for the analyzing process of the analyzer 121. The algorithm of data compensation by the loss analyzer 133 is also arbitrarily selected. The reception device 103 performs data compensation independently from, and not in cooperation with, the transmission device 102.

That is, since it is not necessary to add dedicated functions to the receiver side and the algorithm of the receiver side is independent from that of the transmission side, the transmission device 102 has high versatility. It is only necessary for the reception device 103 to independently perform error concealment (i.e., data compensation).

It is only necessary for the transmission device 102 to discard a part of the encoded data as described above. Accordingly, a general-purpose encoder can be employed as the encoder 123 and it is not necessary to develop a dedicated encoder. The transmission device 102 can therefore be provided easily and at low cost.

As another characteristic of the present embodiment, since the transmission device 102 performs the analyzing process and compares the current image with the previous image, data with high similarity can be selectively discarded. If an image lost at the reception device 103 is to be compensated for with another image, it is theoretically preferable to employ an image having higher similarity to the lost image from the viewpoint of improving image quality. With either algorithm being employed, the reception device 103 usually performs data compensation using an image having higher similarity to the lost image.

Accordingly, the transmission device 102 can selectively discard the data that is easily compensated for by the reception device 103. The transmission device 102 can reduce image quality deterioration of the decoded image more effectively as compared to, for example, randomly selecting data to be discarded or unconditionally discarding data located at a predetermined position of the image.

The data to be discarded may alternatively be selected by other methods. For example, the analyzer 121 analyzes the image data of the current image to obtain arbitrary characteristics regarding the image data. If the characteristics meets a predetermined standard (i.e., if the image data of the current image have predetermined characteristics), the discarding section 171 may discard the encoded data of the current image. If the current image does not have the characteristics, the transmitter 125 may transmit the encoded data.

Although (the image data of) the previous image is used as (the image data of) the reference image in the foregoing description, (the image data of) any kind of image other than (the image data of) of the current image can be employed as (the image data of) the reference image.

As described above, since the transmission device 102 and the reception device 103 operates independent from each other, it is not guaranteed that the reception device 103 may compensate for all the data. Even if the reception device 103 fails to compensate for the lost data, however, the only damage is that the image in the precinct of the picture is not decoded, which rarely results in failure in the entire decoding process. Accordingly, unless such a situation occurs frequently, the influence on the decoded image is not significant.

Note that the transmission device 102 and the reception device 103 may cooperate with each other. If the algorithm to select data to be discarded in the transmission device 102 and the algorithm to compensate for the lost data in the reception device 103 correspond to each other, the influence of discarding the data in the transmission device 102 can be accurately removed, which may contribute to improvement in image quality of the decoded image. With this configuration, however, there is a possibility that the transmission device 102 may become less versatile. In addition, the cooperation may increase the process load of the transmission device 102 and the reception device 103. The cooperation may occupy a part of the communication band.

The processing units (e.g., an encoding unit) in the various processes of the transmission device 102 and the reception device 103 in the foregoing description have been arbitrarily selected, and other processing units, such as a picture unit, may also be employed. The processing unit, however, relates to the delay time. If a large processing unit is employed, data transmission with a short delay time may become difficult to achieve.

Other configurations of the devices described with reference to FIG. 1 may be employed.

For example, the image data of the captured image captured and generated by the image capturing device 101 is input to the transmission device 102 in FIG. 1. However, any types of image data can be transmitted to the reception device 103. For example, the transmission device 102 may read the image data from the recording medium. That is, the image capturing device 101 may be omitted.

The image data output from the reception device 103 can be processed in an arbitrary manner. For example, the image data can be recorded on a recording medium. That is, the display device 104 may also be omitted.

The illustrated devices may have configurations other than those described. Each of the devices may be provided in plural numbers. For example, plural reception device 103 may be connected to a single transmission device 102 so that image data can be transmitted from the single transmission device 102 to the plural reception device 103. In that case, each of the reception devices 103 may have a different algorithm for error concealment.

2. Second Embodiment

Process Flow

In the foregoing description, the transmission device 102 reduces the amount of transmission data to save the communication band. It is possible to increase the amount of code of the encoded data using the saved bandwidth.

In this case, as shown in FIG. 3, the controller 155 supplies the determination result to the discarding section 171 (C101) and then transmits a control signal C102 to the quantizer 162 so that the bit rate increases (i.e., the quantization step size is reduced). The quantizer 162 increases the amount of code of the encoded data by controlling the quantization step size on the basis of this control.

Figure 12:
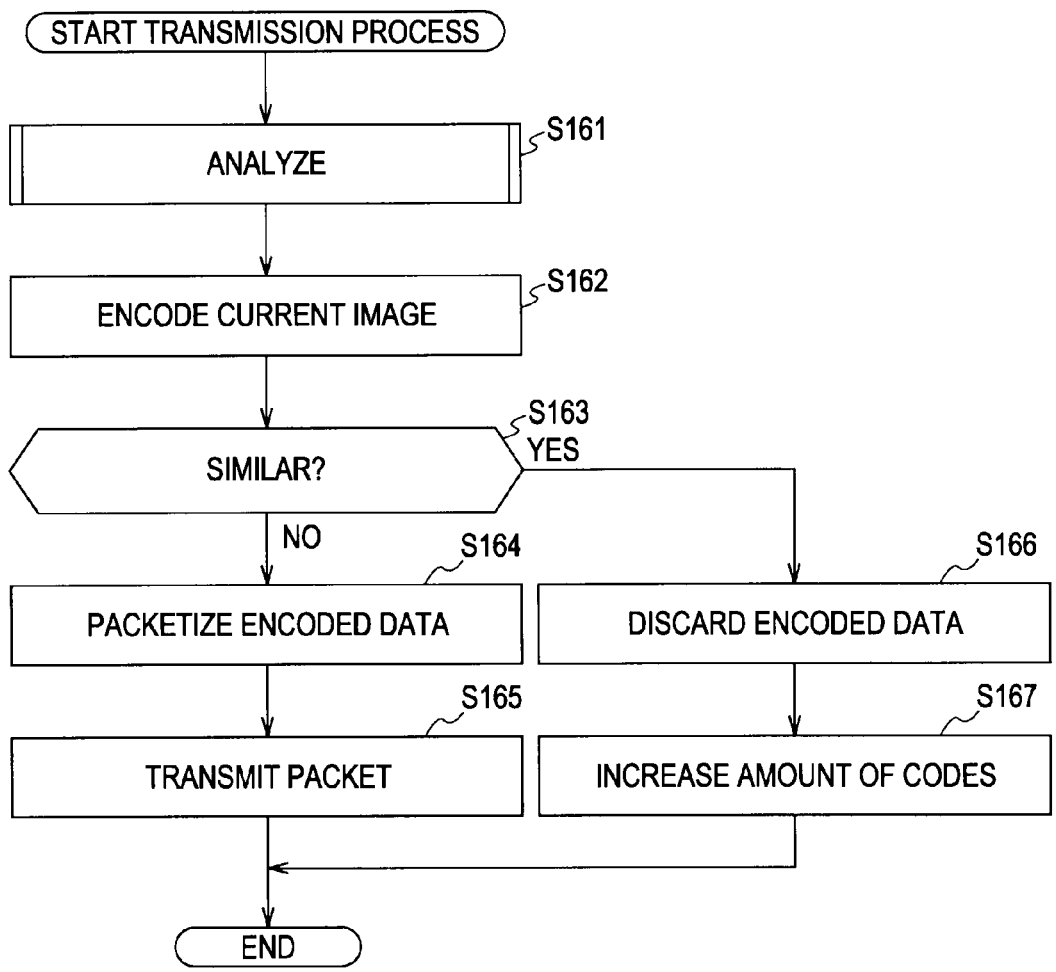
FIG. 12 is a flowchart illustrating another exemplary transmission process.

FIG. 12 is a flowchart illustrating an exemplary flow of the transmission process in that case.

Figure 9:
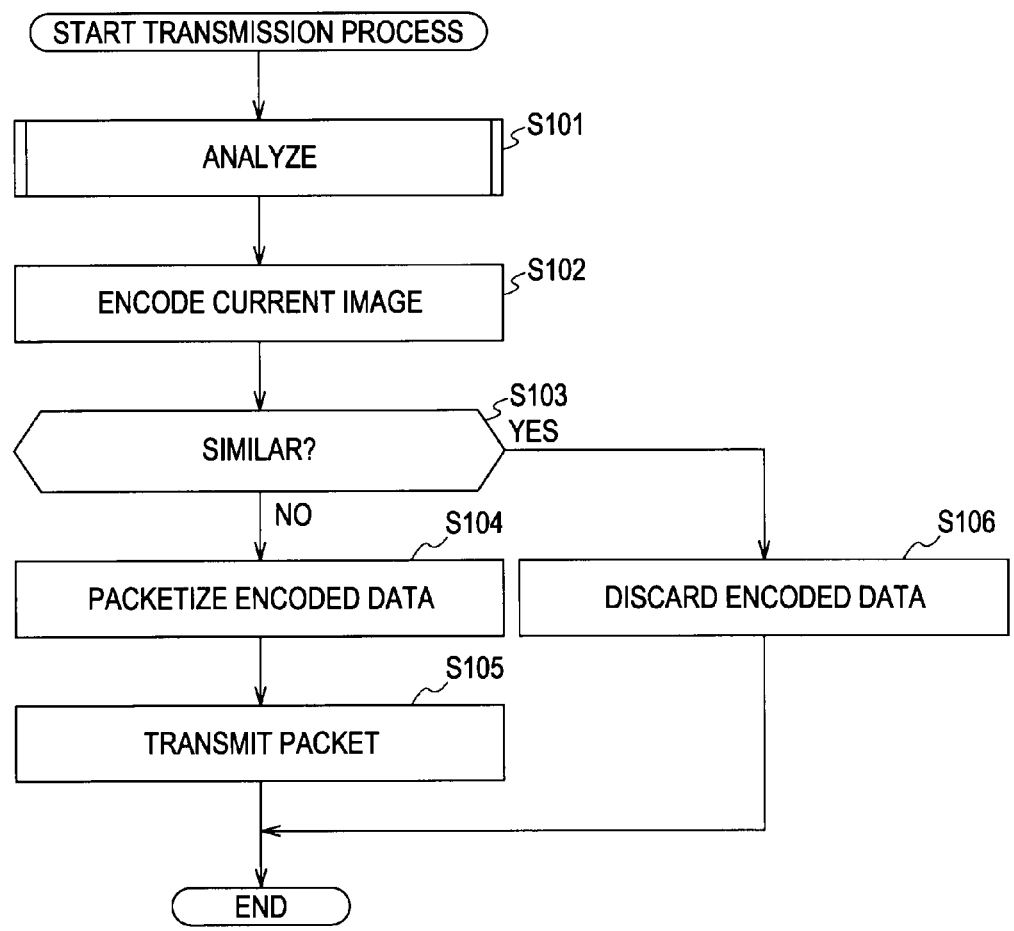
FIG. 9 is a flowchart illustrating an exemplary flow of a transmission process.

The processes of steps S161 to S166 are performed in the same manner as those of the processes of steps S101 to S106 in FIG. 9 except that, when the encoded data is discarded in step S166, the routine proceeds to step S167. In step S167, the quantizer 162 reduces the quantization step size on the basis of the control of the controller 155 and increases the amount of code of the encoded data (i.e., increases the bit rate). When the process of step S167 is completed, the transmission process comes to an end.

As described above, the transmission device 102 discards the data and increases the bit rate of the encoded data to be transmitted using the saved bandwidth otherwise used for data transmission. That is, the bit rate of the encoded data received by the reception device 102 is increased. Theoretically, since the encoded data discarded by the transmission device 102 is compensated for with the transmitted encoded data, the bit rate of the encoded data decoded is eventually increased. That is, the transmission device 102 can further reduce image quality deterioration of the decoded image.

Since the analyzing process by the analyzer 121 and the encoding process by the encoder 123 are performed in parallel, the controller 155 controls the bit rate of the encoded data of the subsequent precincts instead of the encoded data of the current to-be-processed precinct. Although it is possible to control the bit rate of the encoded data of the current to-be-processed precinct, it is necessary for such control to perform the encoding process after the analyzing process is completed. As a result, the delay time may become longer.

3. Third Embodiment

Process Flow

Other data may be transmitted instead of the encoded data to be discarded. For example, the redundant data of the encoded data may be transmitted using the saved communication band.

In this case, as illustrated in FIG. 3, the redundancy encoder 173 performs the redundancy encoding with respect to the encoded data to generate the redundant data buy the generated redundant data is kept untransmitted. Alternatively, the redundancy encoder 173 transmits the generated redundant data with the encoded data, but keeps redundant data which are not transmitted because of, for example, band regulation of the network 110.

On the contrary, the controller 155 supplies the determination result to the discarding section 171 (C101) and discards the encoded data, and then transmits a control signal C103 to the redundancy encoder 173 so that the currently kept redundant data is transmitted instead of the discarded encoded data. The redundancy encoder 173 transmits the currently kept redundant data on the basis of the control.

Figure 13:
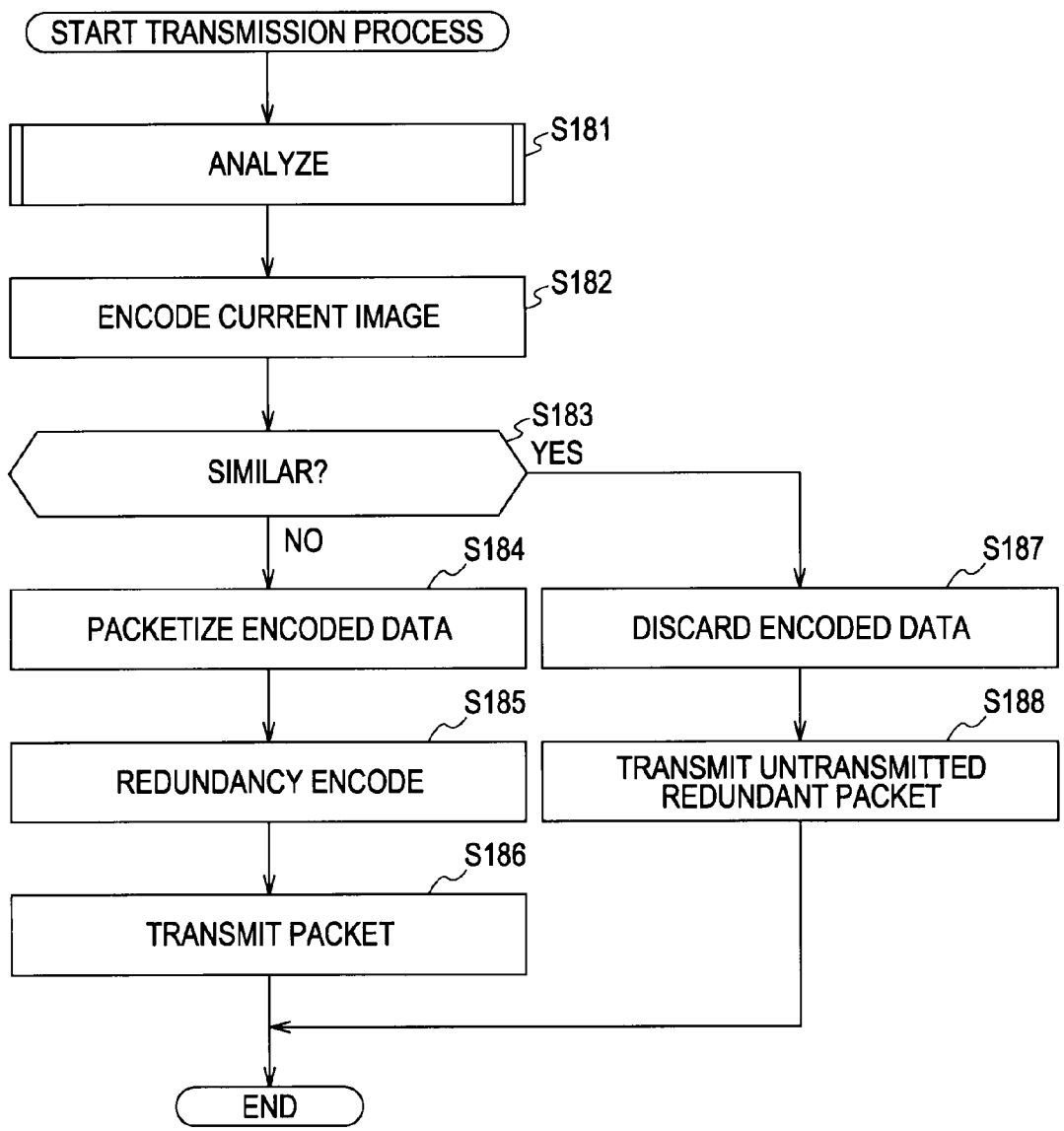
FIG. 13 is a flowchart illustrating a further exemplary transmission process.

FIG. 13 is a flowchart illustrating an exemplary flow of the transmission process in that case.

Also in this case, the processes of steps S181 to S184 are performed substantially in the same manner as the processes of step S101 to S104 illustrated in FIG. 9 except that, when the encoded data is packetized and the packet is generated in step S184, the routine proceeds to step S185.

In step S185, the redundancy encoder 173 carries out the redundancy encoding of the generated packet by using, for example, an error-correcting code, such as the Reed-Solomon (RS) code, and generates redundant data (i.e., redundant packet). When the redundancy encoding is completed, the transmitter 135 transmits the generated packet to the reception device 103 via the network 110 in step S186. The transmitter 135 transmits the packet of the encoded data preferentially or transmits only the packet of the encoded data. As described above, the packet of the redundant data that is not transmitted is kept in the redundancy encoder 173.

When the process of step S186 is completed, the transmission process comes to an end.

If it is determined in step S183 that the current image is similar to the previous image, the routine proceeds to step S187. In step S187, the discarding section 171 discards the encoded data of the current image that is determined to be similar to the previous image. In step S188, the transmitter 125 transmits the untransmitted redundant packet kept by the redundancy encoder 173 instead of the packet of the discarded encoded data.

When the process of step S188 is completed, the transmission process comes to an end.

As described above, the transmission device 102 discards the data and transmits the redundant data using the saved bandwidth otherwise used for data transmission. In this manner, since the larger amount of redundant data can be transmitted than in the case where the bandwidth is not saved, the transmission device 102 can increase redundancy of the encoded data. That is, the transmission device 102 can improve restoration performance of the encoded data to be transmitted and can further reduce image quality deterioration of the decoded image.

Note that the redundancy, i.e., the data volume of the redundant data generated by the redundancy encoder 173 may be controlled in accordance with the amount of the encoded data to be discarded.

4. Fourth Embodiment

Exemplary Configurations of Transmission Device and Reception Device

Other data to be transmitted instead of the encoded data to be discarded may be any types of data other than the redundant data. For example, information for controlling the error concealment process in reception device 103 may be transmitted.

In an exemplary system, information regarding whether or not the replacement can be made is transmitted from the transmission device 102 as the header information (i.e., concealment header) so that the reception device 103 can select the previous image to replace the current image among plural precincts and that the reception device 103 can select the suitable image.

Also in such a system, when the transmission device 102 discards the encoded data, the encoded data is replaced in the reception device 103. In this case, the reception device 103 can select a more suitable precinct as a previous image by using information of the concealment header supplied from the transmission device 102 which has been described above. That is, the reception device 103 can make a replacement with more suitable encoded data. That is, the transmission device 102 can further reduce image quality deterioration of the decoded image by transmitting such a concealment header instead of the discarded data.

That is, the present embodiment of the invention can be easily applied to an uncommon system in which, for example, control information is transmitted and received between the transmission device 102 and the reception device 103.

Figure 14:
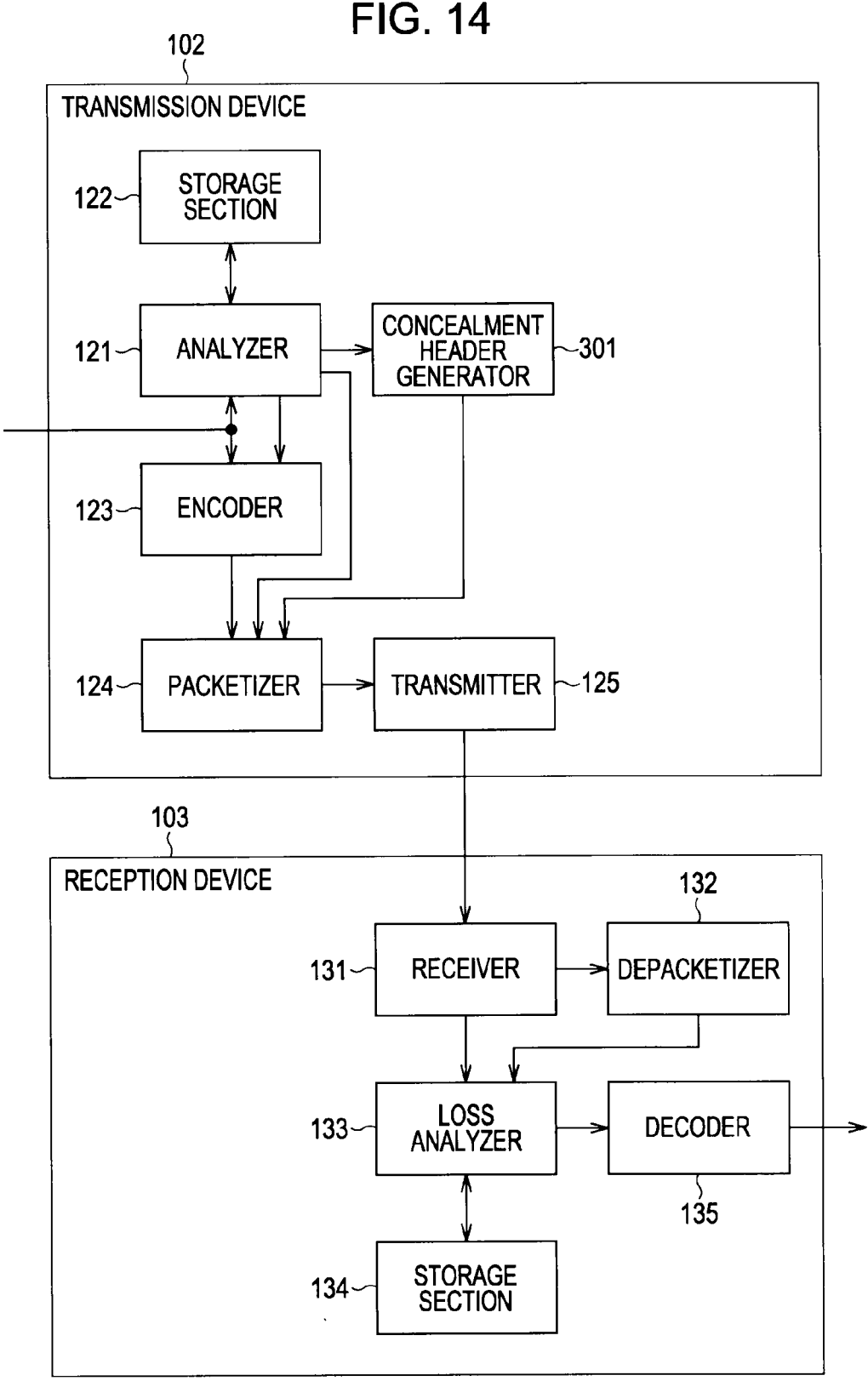
FIG. 14 is a block diagram of other exemplary configurations of the transmission device and the reception device.

FIG. 14 is a block diagram of an exemplary configuration of the transmission device 102 and the reception device 103 in that case.

As illustrated in FIG. 14, the transmission device 102 includes a concealment header generator 301 in addition to those components described with reference to FIG. 2.

In this case, the analyzer 121 analyzes error concealment with respect to the image data input. The error concealment is a process of concealing transmission error generated during data transmission. The analyzer 121 compares input image data with image data of a picture read from the storage section 122 immediately before the picture of interest. That is, the analyzer 121 compares the images in the precincts at corresponding positions of the two continuous pictures (i.e., frames or fields). The analyzer 121 supplies the comparison result to the concealment header generator 123 as the analysis result.

The concealment header generator 301 generates the concealment header which is the concealment information describing the concealment method of a precinct error on the basis of the analysis result. In particular, the concealment header generator 301 generates header information (concealment header) which includes information representing a precinct that can be replaced by a precinct in which an error occurs during the error concealment process by the reception device 103 (i.e., information describing that replacement can be made with which data in which precinct of which picture) and supplies the generated header information to the packetizer 124.

The packetizer 124 creates the packet for transmission (i.e., packetizes) on the basis of the encoded data supplied from the encoder 121 and the concealment header supplied from the concealment header generator 301. The packetizer 124 adds (multiplexes) the concealment header to the encoded data to generate a packet. The thus generated packet is transmitted to the reception device 103 by the transmitter 125.

The analyzer 121 determines similarity between the previous image and the current image as in the processes described with reference to FIGS. 1 to 13 and supplies the determination result to the packetizer 124 or the encoder 123.

If the current image is similar to the previous image, the packetizer 124 discards the encoded data, packetizes only the concealment header supplied from the concealment header generator 301 and causes the transmitter 125 to transmit the packet.

The configuration of the reception device 103 is substantially the same as that illustrated with reference to FIG. 2.

The packet transmitted from the transmission device 102 is received by the receiver 131 and depacketized by the depacketizer 132 such that the encoded data is extracted. The extracted encoded data is supplied to the loss analyzer 133. The depacketizer 132 also extracts, along with the encoded data, the concealment header and supplies the extracted encoded data and the concealment header to the loss analyzer 133.

The loss analyzer 133 performs error concealment upon occurrence of the transmission error using the encoded data stored in the storage section 134 on the basis of the concealment header.

The loss analyzer 133 refers to the concealment header and specifies previously encoded data that can be used for data replacement (i.e., specifies which data in which precinct of which picture to be used for the replacement). The loss analyzer 134 then reads the specified encoded data from the storage section 134 and replaces the precinct in which transmission error occurs by the read data.

The decoder 135 decodes the encoded data already being subject to the error concealment process supplied from the loss analyzer 134 and outputs the image data of the baseband.

Concealment Header

Figure 15:
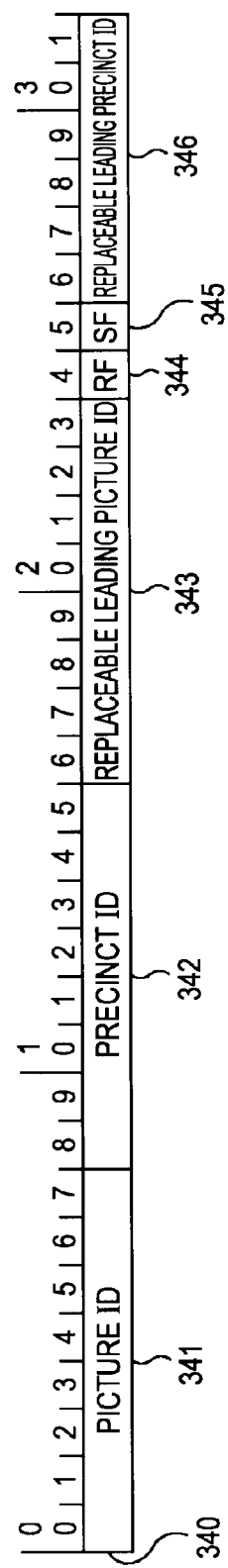
FIG. 15 is a schematic diagram of a configuration of a concealment header.

Next, the concealment header will be described. FIG. 15 illustrates an exemplary configuration of the concealment header. As illustrated in FIG. 15, the concealment header 340 is 32-bit information which includes a picture ID 341, a precinct ID 342, a replaceable leading picture ID 343, a replacement flag (RF) 344, a slide flag (SF) 345 and a replaceable leading precinct ID 346.

The picture ID 341 is 8-bit identification information which identifies the current (i.e., to-be-processed) picture in the entire moving image data. The precinct ID 342 is 8-bit identification information which identifies the current (i.e., to-be-processed) precinct in the picture.

The replaceable leading picture ID 343 is 8-bit identification information each having a precinct replaceable by the current precinct. The replaceable leading picture ID 343 represents a leading picture of the picture group continuing in the time direction until the current picture.

That is, replaceable leading picture ID 343 is the information indicating that to which picture the current precinct can go back for replacement. Identification information (i.e., an ID of the same type as that of the picture ID 341) which identifies the picture in the entire moving image data is set to the replaceable leading picture ID 343.

The RF 344 is 1-bit flag information, indicating whether or not the current precinct can be replaced by the data of the picture after the replaceable leading picture ID 343. Although it is also possible to determine whether or not the current precinct can be replaced by a previous picture with reference to the replaceable leading picture ID 343, the determination becomes easier when the RF 344 is used.

The SF 345 is 1-bit flag information, indicating whether or not the current precinct can be replaced by the data of the previous precinct of the same picture. The replaceable leading precinct ID 346 is 6-bit identification information representing the leading precinct of the precinct group which can be replaced by the current precinct. The precinct group continues in the space direction to the current precinct in the current picture.

That is, replaceable leading precinct ID 346 is the information indicating that to which precinct the current precinct can go back for replacement.

Identification information (i.e., an ID of the same type as that of the precinct ID 342) which identifies the current precinct in the picture compressed to 6-bit information is set to the replaceable leading precinct ID 346.

The bit length of the concealment header 340 is arbitrarily determined. It is possible to set the bit length of the replaceable leading precinct ID 346 the same as that of the precinct ID 342. The bit length of the information described above is also arbitrarily determined.

As described above, the concealment header 340 includes information indicating the range of data that can be used for replacement of the current (i.e., to-be-processed) precinct. The loss analyzer 133 knows the range on the basis of this information and replaces the data using the encoded data within the range stored in the storage section 134.

Referring again to FIG. 8, the information in the concealment header 340 will be described in more detail. Assuming that a precinct 253-3 is the current (i.e., to-be-processed) precinct and that the transmission error occurred in this precinct 253-3.

If the RF 344 and the SF 345 of the concealment header 340 added to (a part or an entire) the packet of the precinct 253-3 are OFF (e.g., "0"), then the precinct 253-3 has no precinct to replace with.

If the RF 344 is turned OFF and the SF 345 is turned ON (e.g., "1"), the precinct 253-3 has a replaceable precinct in the picture 253. For example, if the replaceable leading precinct ID 346 represents the precinct 253-2, then the precinct 253-3 can be replaced by the precinct 253-2.

If the replaceable leading precinct ID 346 represents the precinct 253-1, then the precinct 253-3 can be replaced by either of the precinct 253-1 or the precinct 253-2, for example.

In practice, the precinct is often configured by pixels of several lines. In usual images, similarity between adjacent precincts is high and thus difference therebetween is often small. That is, precincts closer to each other are more likely to be replaced with each other.

Then, in the concealment header 340, the furthest (the most recent) precinct from the current (i.e., to-be-processed) precinct among the replaceable precincts is indicated by the replaceable leading precinct ID 346. That is, it is guaranteed that precincts after the precinct indicated by the replaceable leading precinct ID 346 (until the current precinct) can be replaced.

If the RF 344 is ON, there is a replaceable precinct in other pictures. For example, if the replaceable leading picture ID 343 indicates the picture 252, the precinct 253-3 can be replaced by the precinct 252-3 at the same position in the picture 252.

If the replaceable leading picture ID 343 indicates the picture 251, the precinct 353-3 can be replaced by either of the precinct 251-3 at the same position in the picture 251 or the precinct 252-3 at the same position in the picture 252, for example.

In a normal moving image, patterns in continuous pictures are substantially the same and difference therebetween is small except for singular points, such as scene changes. That is, in a normal image, precincts temporally closer to each other are more likely to have replaceable precincts.

Then, in the concealment header 340, the furthest (the least recent) picture from the current (i.e., to-be-processed) picture among the pictures having replaceable precincts is indicated by the replaceable leading picture ID 343. That is, it is guaranteed that precincts after the precinct indicated by the replaceable leading picture ID 343 (until the current precinct) can be replaced.

In practice, however, if the storage section 632 does not keep the data, the loss analyzer 133 is not able to replace the precinct. For example, if the replaceable leading picture ID 343 indicates the picture 251 and if the storage section 134 keeps the data of the picture 252, then the loss analyzer 133 can replace the precinct 253-3 by the precinct 252-3.

As described above, the concealment header 340 indicates the position (i.e., the range) in which the replaceable data exists. That is, the transmission device 102 which generates the concealment header 340 specifies the range. In particular, the analyzer 121 calculates a difference value of the data of the precinct input this time and the data of the immediately previous precinct kept in the storage section 122.

The analyzer 121 calculates a difference value of the data of the currently input precinct and the data of the precinct at the same position in the immediately previous picture kept in the storage section 122. On the basis of these calculation results, the analyzer 121 determines similarity among the data of the precinct currently input, an immediately previous precinct in the same picture and a precinct at the same position in an immediately previous picture to determine whether the replacement can be made.

According to the determination result, the concealment header generator 301 suitably updates the information of the replaceable leading picture ID 343 or the replaceable leading precinct ID 346, if the replacement is not possible.

Process Flow

Figure 16:
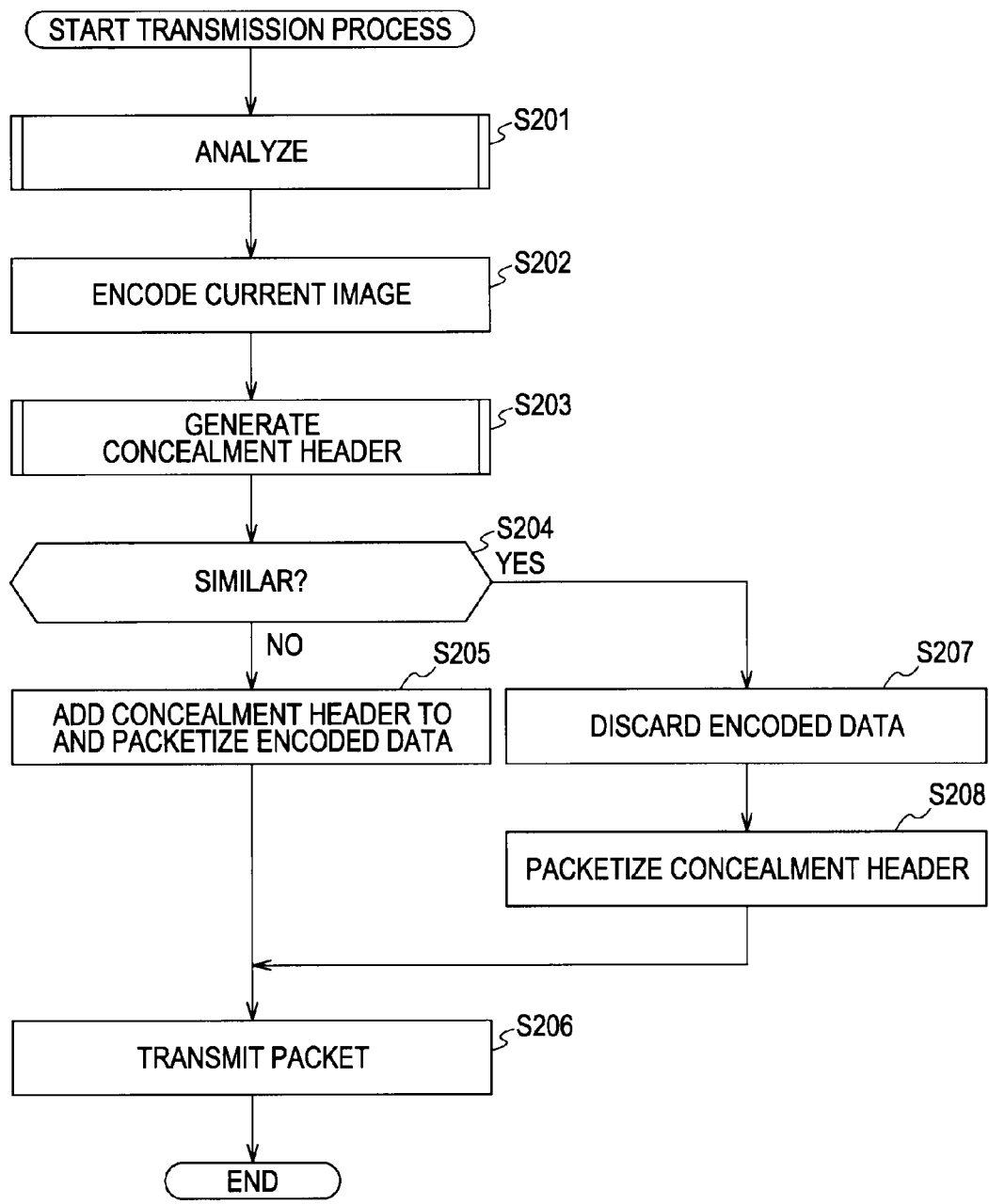
FIG. 16 is a flowchart illustrating a further exemplary transmission process.

Referring now to the flowchart of FIG. 16, an exemplary flow of the transmission process performed by transmission device 101 in this case will be described.

When image data is input into the transmission device 101 and the transmission process is started, the analyzer 121 performs the analyzing process in step S201 as illustrated in step S101 in FIG. 9. Details of the analyzing process are described later. After the analyzing process is completed, the routine proceeds to step S202. In step S202, as in step S102 of FIG. 9, the encoder 123 encodes data of the current image and generates encoded data.

In step S203, the concealment header generator 301 performs the concealment header generation process. Details of the concealment header generation process will be described later. When the concealment header generation process is completed, the routine proceeds to step S204.

In step S204, the packetizer 124 determines whether or not the current image and the previous image are similar to each other as in step S103 of FIG. 9 on the basis of the result of the analyzing process performed in step S201. If the current image and the previous image are not similar to each other, the routine proceeds to step S205.

In step S205, the packetizer 124 adds the concealment header to the encoded data of the current image generated by the process of step S203 and generates a packet. The generated packet may be subject to the redundancy encoding by using, for example, an error-correcting code, such as the Reed-Solomon (RS) code, and generates redundant data (i.e., redundant packet).

In step S206, the transmitter 125 transmits the packet generated by the packetizer 124 to the reception device 103 via the network 110 as in step S105 of FIG. 9. When the packet is transmitted, the transmission process comes to an end.

If it is determined in step S204 that the current image and the previous image are not similar to each other, the routine proceeds to step S207. In step S207, the packetizer 124 discards the to-be-processed encoded data (of the current image). The packetizer 124 packetizes only the concealment header in step S208. When the process of step S208 is completed, the routine returns to step S206 where the packet generated by the process of step S208 is transmitted by the transmitter 125. When the packet is transmitted, the transmission process comes to an end.

The transmission device 102 repeats the above-described transmission process every time image data corresponding to one precinct is input.

Figure 17:
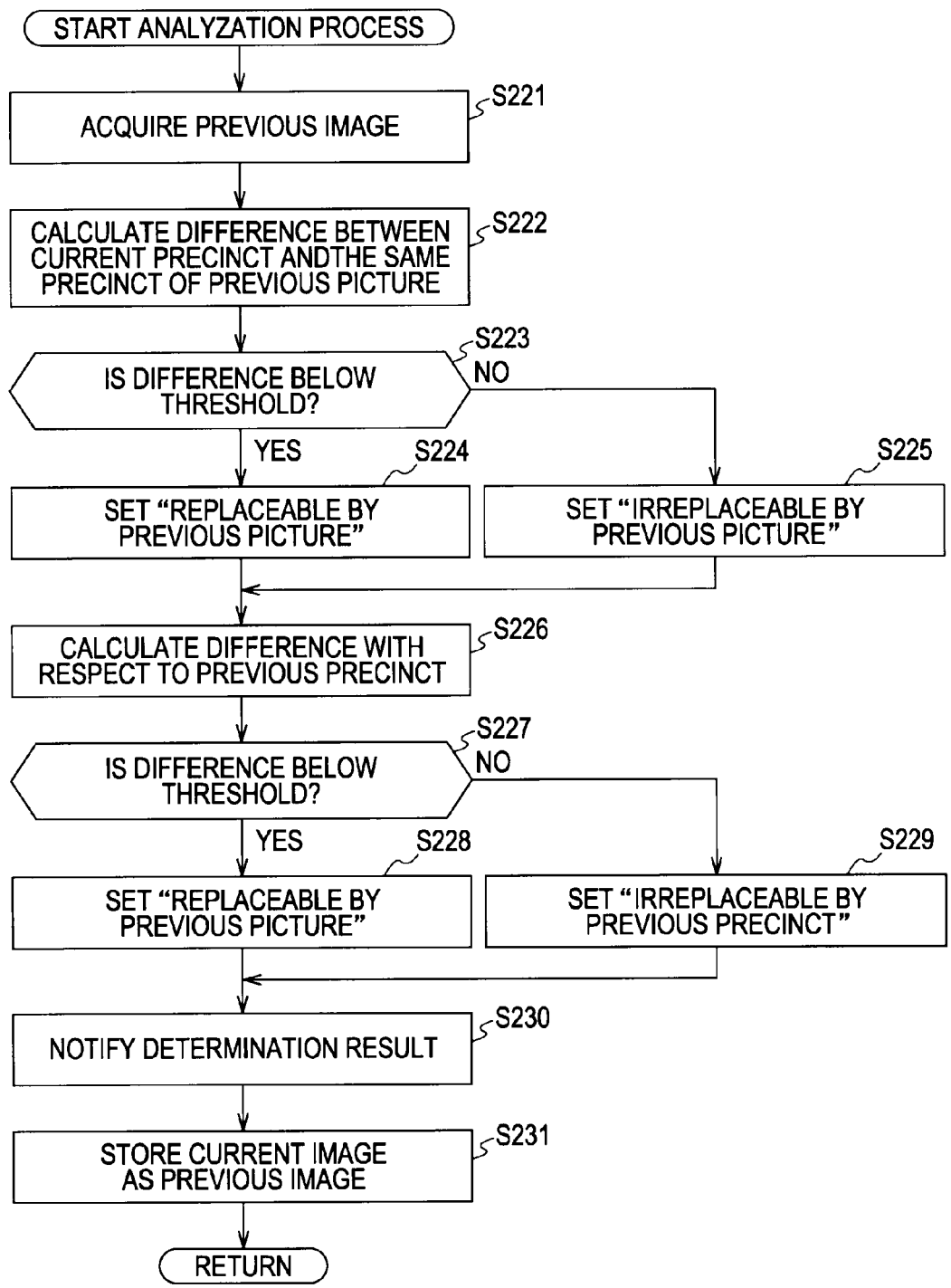
FIG. 17 is a flowchart illustrating another exemplary analyzing process.

Next, an exemplary flow of an analyzing process performed in step S201 of FIG. 16 will be described with reference to a flowchart of FIG. 17.

When the analyzing process is started, the analyzer 121 acquires image data of the previous image from the storage section 122 in step S221. In step S222, the analyzer 121 performs difference calculation between the current (i.e., to-be-processed) precinct and the same precinct of the previous picture (i.e., the precinct at the same position in the immediately previous picture) read from the storage section 122.

In step S223, the analyzer 121 determines whether or not the calculated difference is not greater than a predetermined threshold. If it is determined that the difference is smaller than the threshold, the routine proceeds to step S224. In step S224, the analyzer 121 sets up "replaceable by previous picture" as an analysis result. The routine proceeds to step S226. If it is determined in step S223 that the difference is larger than the threshold, the analyzer 121 causes the routine to proceed to step S225, where the analyzer 121 sets up "irreplaceable by previous picture" as an analysis result. The routine proceeds to step S225.

The analyzer 121 performs difference calculation between the current precinct and the previous precinct (i.e., immediately previous precinct) read from the storage section 122 in step S226. In step S227, the analyzer 121 determines whether or not the difference is smaller than a predetermined threshold.

If it is determined that the difference is smaller than the threshold, the analyzer 121 causes the routine to proceed to step S228 where the analyzer 121 sets up "replaceable by previous picture" as an analysis result. If it is determined in step S227 that the difference is larger than the threshold, the analyzer 121 causes the routine to proceed to step S229 where the analyzer 121 sets up "irreplaceable by previous picture" as an analysis result.

Figure 10:
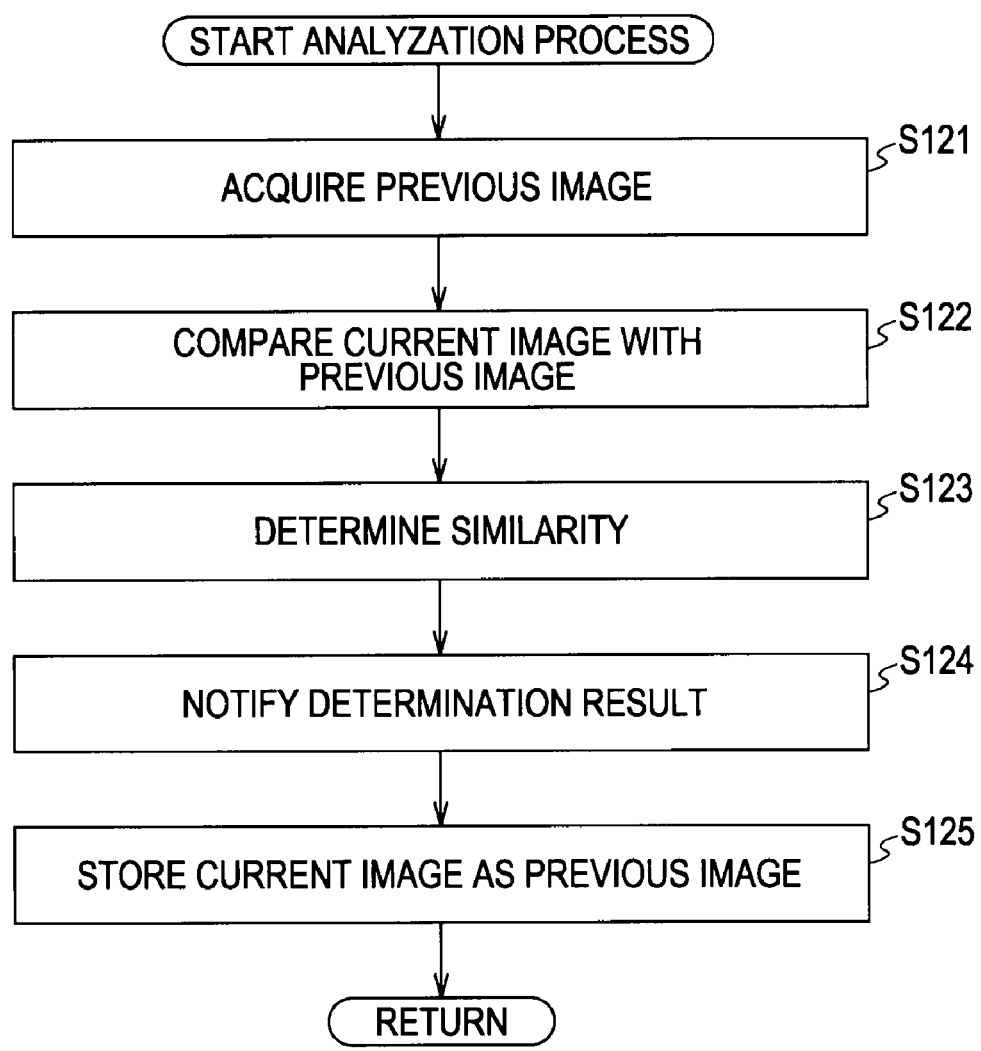
FIG. 10 is a flowchart illustrating an exemplary flow of an analyzing process.

In step S230, the analyzer 121 notifies the determination result to the packetizer 124 as in step S124 of FIG. 10. In step S231, the analyzer 121 supplies the image data of the current image to the storage section 122 as in step S125 of FIG. 10. The storage section 122 stores the image data so that the image data can be used as a previous image. When the process of step S231 is completed, the analyzing process comes to an end. The routine returns to step S201 of FIG. 16 and the processes after step S202 are performed.

As described above, by performing each process, the analyzer 121 can determine the similarity of inter-frame images and provide the concealment header generator 123 with information necessary to generate the concealment header 340.

Figure 18:
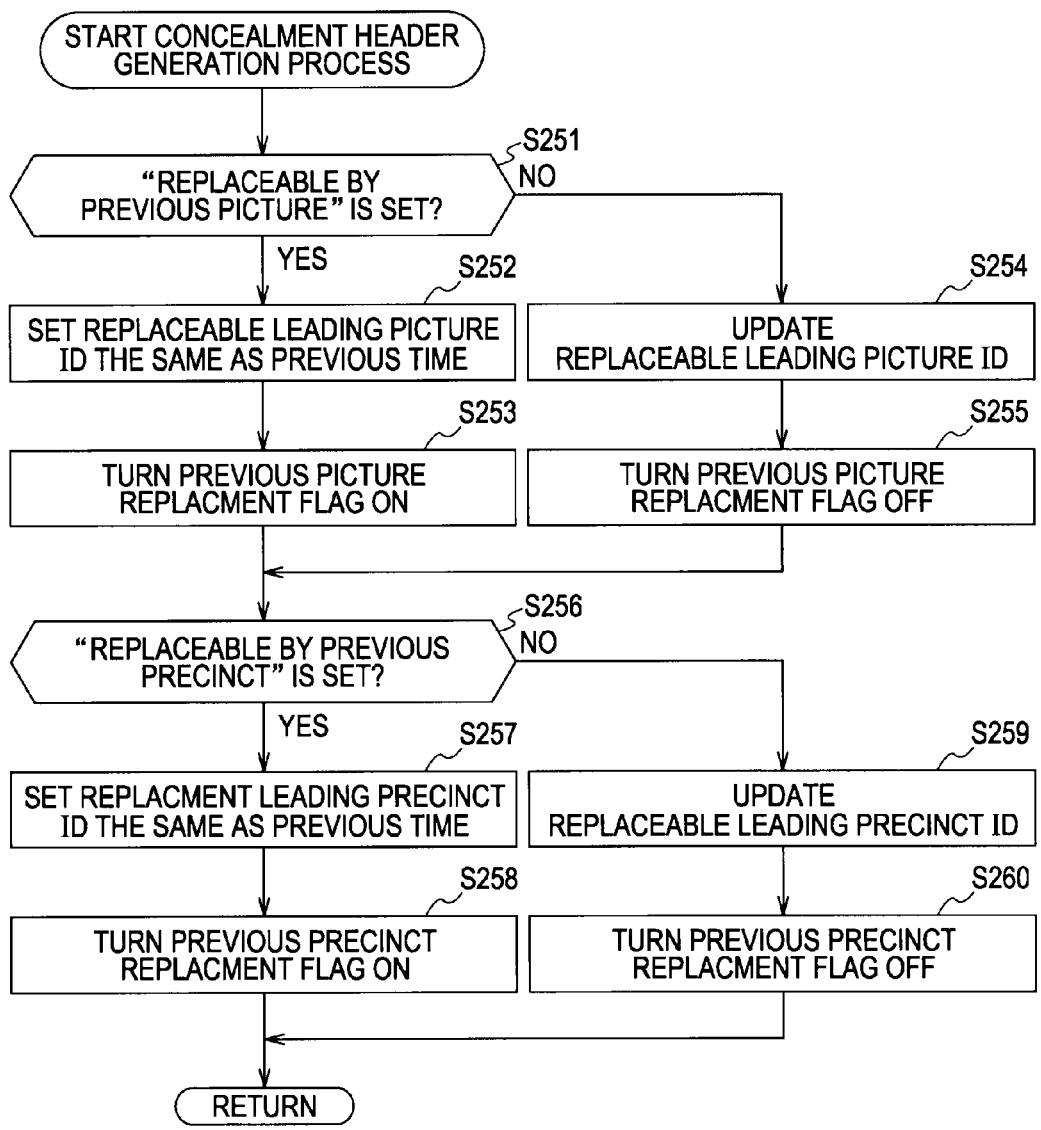
FIG. 18 is a flowchart illustrating an exemplary flow of a concealment header generation process.

Next, an exemplary flow of a concealment header generation process performed in the concealment header generator 301 will be described with reference to the flowchart of FIG. 18.

When the concealment header generation process is started, the concealment header generator 301 determines whether or not "replaceable by previous picture" is set as the analysis result in step S251.

If it is determined that "replaceable by previous picture" is set, the concealment header generator 301 causes the routine to proceed to step S252, where the concealment header generator 301 sets the value of the replaceable leading picture ID 343 to the same value as that of the previous time. In step S253, the concealment header generator 301 turns the RF 3440N (e.g., "1") which is the previous picture replacement flag. The routine then proceeds to step S256.

If it is determined in step S251 that "irreplaceable by previous picture" is set, the concealment header generator 301 causes the routine to proceed to step S254, where the value of the replaceable leading picture ID 343 is updated to the identification information of the current picture. In step S255, the concealment header generator 301 turns the value of RF 344 which is the previous picture replacement flag OFF (e.g., "0") and causes the routine to proceed to step S256.

In step S256, the concealment header generator 301 determines whether or not "replaceable by previous precinct" is set as the analysis result.

If it is determined that "replaceable by previous precinct" is set, the concealment header generator 301 causes the routine to proceed to step S257, where the value of the replaceable leading precinct ID 346 is set to the same value as the previous time. In step S258, the concealment header generator 301 turns the value of the SF 345 which is the previous precinct replacement flag ON (e.g., "1") and completes the concealment header generation process.

If it is determined in step S256 that "irreplaceable by previous precinct" is set, the concealment header generator 301 causes the routine to proceed to step S259, where the value of the replaceable leading precinct ID 346 is updated to the identification information of the current precinct. In step S260, the concealment header generator 301 turns the value of the SF 345 which is the previous precinct replacement flag OFF (e.g., "1") and completes the concealment header generation process.

With these processes, the concealment header generator 301 can generate the concealment header 340 which is referred to in order to reduce influence of the transmission error while controlling increase in delay time. When being provided with the concealment header 340, the reception device 103 can perform the error concealment process in the precinct unit smaller than the picture unit.

Figure 19:
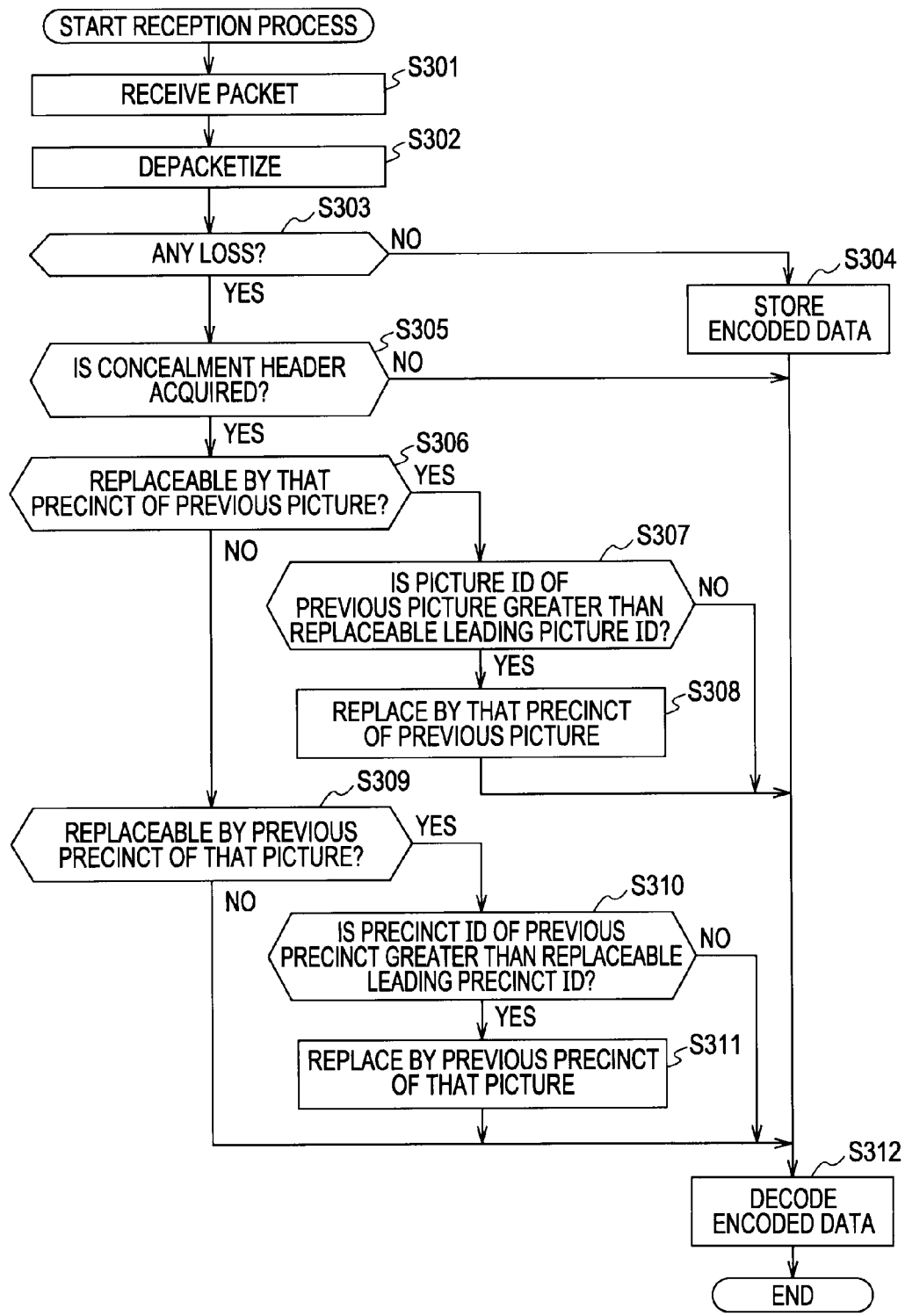
FIG. 19 is a flowchart illustrating another exemplary reception process.

Next, an exemplary flow of the reception process performed by the reception device 103 will be described with reference to the flowchart of FIG. 19.

When the reception process is started, the receiver 131 receives the packet transmitted from the transmission device 102 via the network 110 in step S301. In step S302, the depacketizer 132 depacketizes the received packet and extracts the encoded data.

In step S303, the loss analyzer 133 determines whether or not the loss (i.e., error) occurred in the encoded data of the current (i.e., to-be-processed) precinct. If it is determined that no loss has occurred, the routine proceeds to step S304. In step S304, the loss analyzer 133 supplies the encoded data to the storage section 134. The storage section 134 stores the encoded data for future use as a previous image.

When the process of step S304 is completed, the routine proceeds to step S312.

If it is determined in step S303 that a loss has occurred, the routine proceeds to step S305. In step S305, the loss analyzer 133 determines whether or not the concealment header 340 has been acquired. If it is determined that no concealment header 340 has been acquired, the loss analyzer 133 does not perform error concealment because it is difficult to perform accurate error concealment. The routine then proceeds to step S312.

If it is determined in step S305 the concealment header 340 has been acquired, the routine proceeds to step S306. In step S306, the loss analyzer 133 determines whether or not replacement is possible by the same precinct of the previous picture (i.e., the precinct at the same position in the immediately previous picture) on the basis of the information regarding the concealment header 340. If the value of the RF 344 is ON (e.g., "1"), and if it is determined that the replacement can be made, the routine proceeds to step S307.

In step S307, the loss analyzer 133 determines whether or not the value of the picture ID of the previous picture read from the storage section 134 is greater than the replaceable leading picture ID 343. That is, it is determined whether or not the picture of the loss analyzer 133 indicated by the replaceable leading picture ID is older than the previous picture read from the storage section 134.

If it is determined that the previous picture read from the storage section 134 is more recent than the picture indicated by the replaceable leading picture ID, the routine proceeds to step S308. In step S308, the loss analyzer 133 replaces the current (i.e., to-be-processed) precinct by the precinct at the same position in the previous picture read from the storage section 134. When the process of step S308 is completed, the routine proceeds to step S312.

If it is determined in step S307 that the value of the picture ID of the previous picture read from the store 134 is smaller than the replaceable leading picture ID, since no data regarding the replaceable picture is kept in the storage section 134, the loss analyzer 133 does not perform the error concealment. The routine then proceeds to step S312.

If it is determined in step S306 that replacement by the precinct at the same position in the previous picture read from the storage section 134 is not possible, the routine proceeds to step S309.

In step S309, the loss analyzer 631 determines whether or not the replacement is possible by the previous precinct of the same picture (i.e., the immediately previous precinct of the same picture) read from the storage section 134. If the value of the SF 345 is OFF (e.g., "0"), and if it is determined that the replacement is not possible, the loss analyzer 133 does not perform the error concealment. The routine then proceeds to step S312.

If it is determined in step S309 that the value of the SF 345 is ON (e.g., "1") and that replacement can be made by the previous precinct of the same picture read from the storage section 134, the routine proceeds to step S310. In step S310, the loss analyzer 133 determines whether or not the value of the precinct ID of the previous precinct read from the storage section 134 is greater than the replaceable leading precinct ID 346.

If it is determined that the value of the precinct ID of the previous precinct read from the storage section 134 is greater than the replaceable leading precinct ID 346, since no replaceable precinct is kept in the storage section 134, the loss analyzer 133 does not perform the error concealment. The routine then proceeds to step S312.

That is, if it is determined that the previous precinct read from the storage section 134 is the precinct less recent than the precinct indicated by the replaceable leading precinct ID 346, since no replaceable precinct is kept in the storage section 134, the loss analyzer 133 does not perform the error concealment. The routine then proceeds to step S312.

If it is determined that the value of the precinct ID of the previous precinct read from the storage section 134 is greater than the replaceable leading precinct ID 346, the routine proceeds to step S311. That is, if it is determined that the previous precinct read from the storage section 134 is the precinct more recent than the precinct indicated by the replaceable leading precinct ID 346, the process proceeds to step S311.

In step S311, the loss analyzer 133 replaces the current (i.e., to-be-processed) precinct by the previous precinct of the same picture read from the storage section 134. After the process of step S311 is completed, the routine proceeds to step S312.

In step S312, the decoder 135 decodes the encoded data. Upon completion of the process of step S312, the reception process comes to an end.

The reception device 301 implements the reception process as described above. The loss analyzer 133 can perform the error concealment process appropriately in the precinct unit smaller than the picture unit on the basis of the concealment header 340. That is, the loss analyzer 133 can reduce influence of the transmission error, while controlling increase of the delay time.

It is also possible that the reception device 103 determines whether or not the replacement can be made and that replacement is made in a unit smaller than the picture unit without using the concealment header 340, which is described above. In this case, however, a buffer amount in the reception device 103 may increase whereby the delay time may become longer. Since there is a possibility of data loss in the reception device 103, it may take longer time to determine accurately.

Then, as described above, in the transmission device 102 having all the necessary data, determines whether or not the replacement is possible and the information regarding the determination is notified to the reception device 103 using the concealment header 340. In this manner, the transmission device 102 can reduce the influence of the transmission error on the reception device 103 while controlling increase of the delay time.

Even in this case, transmission device 102 discards a part of the encoded data, transmits the encoded data and causes the reception device 103 to conceal the error, thereby reducing the bandwidth necessary for transmission while controlling image quality deterioration in the image data transmission.

As described above, the transmission device 102 can save the transmission band by not transmitting the encoded data of the precinct with little variation. Since the compensation function of the reception device is utilized and thus there is no necessity of implementing complicated communication between the transmission and the reception sides, the transmission device 102 can be made simple. That is, only the reception device 103 should have the compensation function, which can be provided through simple modification of the transmission device 102.

When the redundant code, for example, id inserted in the saved bandwidth, redundancy can be increased without reducing the bit rate of image quality. An average rate per precinct can be increased by allocating the saved bandwidth to the subsequent precincts.

Although the encoded data is discarded in the present specification, the to-be-discarded precinct can be discarded in a state of baseband image data so that encoding process can be omitted. In this case, since the encoding process is omitted, load of the transmission device 102 can be reduced accordingly. It is not possible in this case, however, that the analyzing process by the analyzer 121 and the encoding process by the encoder 123 are executed in parallel regarding the same precinct. As a result, the delay time in data transmission may be increased. It is possible, for example, to execute the encoding process and the analyzing process in parallel by delaying a to-be-processed precinct of the encoding process from the to-be-processed precinct of the analyzing process so as to somewhat reduce the delay time.

The series of processes described above can be implemented not only by hardware but also by software. The hardware and the software may be configured as a personal computer as illustrated in FIG. 20.

In FIG. 20, a central processing unit (CPU) 501 of a personal computer 500 executes various processes in accordance with a program stored in a read only memory (ROM) 502 or a program loaded to a random access memory (RAM) 503 from a storage section 513. Data necessary when the CPU 501 executes various processes is also stored in the RAM 503.

The CPU 501, the ROM 502 and the RAM 503 are mutually connected via a bus 504. An I/O interface 510 is also connected to the bus 504.

An input section 511, an output section 512, a storage section 513 and a communication section 514 are connected to the I/O interface 510. The input section 511 includes a keyboard and a mouse. The output section 512 includes a display, such as a cathode ray tube (CRT), a liquid crystal display (LCD) and an organic electroluminescence display, and a speaker. The storage section 513 includes hard disk and a solid state drive (SSD). The communication section 514 includes a modem, a local area network (LAN) interface, a universal serial bus (USB) interface, the Institute of Electrical and Electronic Engineers (IEEE) 1394 interface, the Bluetooth interface or a wireless LAN interface. The communication section 514 establishes communications via a network, such as the Internet.

A drive 515 is connected to the I/O interface 510 if necessary. A removable media 521, such as a magnetic disc, an optical disc, a magneto-optical disc and a semiconductor memory, are mounted to the drive 515. Computer programs read from the removable medium 521 is installed in the storage section 513 if necessary.

If the series of processes described above are run on software, a program which forms the software is installed from a network or a recording medium.

The recording medium may include the removable medium 521 as illustrated in FIG. 20, which is provided separately from the apparatus body. Examples of the removable medium 521 may include a magnetic disc (including a flexible disc), an optical disc (including compact disc-read only memory (CD-ROM) and a digital versatile disc (DVD)), a magneto-optical disc (including a mini disc (MD)) and a semiconductor memory. These media have programs stored therein and are provided for distribution of the programs to users. The recording medium may also be a program-storing ROM 502 or hard disk included in the storage section 513 which are previously incorporated in the apparatus body and distributed to users.

It is to be noted that in the present specification, the steps describing the program stored on the program recording medium include not only processes carried out in time series in the described order but also processes carried out in parallel or individually and not necessarily in time series.

In the present specification, a system refers to an apparatus as a whole formed by plural devices.

Note that a structure illustrated as a single device (or a processing section) in the foregoing description may be divided into plural devices (or processing sections). A structure, on the contrary, illustrated as plural devices (or processing sections) in the foregoing description may be collected to function as a single device (or a processing section). Additional structures may be provided to each device (or each processing section). A structure of a certain device (or processing section) may partially be included in another device (or processing section) so long as an overall structure or operation of the system remains unchanged.

The present application contains subject matter related to that disclosed in Japanese Priority Patent Application JP 2008-321221 filed in the Japan Patent Office on Dec. 17, 2008, the entire content of which is hereby incorporated by reference.

It is to be understood that the foregoing description of the embodiment of the invention is illustrative only and that various modification may be made without departing from the spirit and scope of the invention.

What is claimed is:

1. An information processor, comprising:
    an analyzer configured to analyze image data to obtain a level of similarity between current image data, which is to be processed, and reference image data, to determine whether or not the current image data and the reference image data are similar to each other depending on whether or not the level of similarity reaches a predetermined threshold, and to store the current image data in a storage unit irrespective of whether the current image data is determined to be similar to the reference image data;
    an encoder configured to encode the current image data;
    a discarding section configured to discard encoded data generated from the current image data encoded by the encoder when the current image data is determined to be similar to the reference image data; and
    a transmitter configured to transmit the encoded data generated from the current image data encoded by the encoder when the current image data is determined not to be similar to the reference image data.

2. The information processor according to claim 1, wherein the reference image data is processed by the analyzer before the current image data, which is to be processed.

3. The information processor according to claim 2, further comprising:
    the storage unit configured to store processed image data, wherein
    the analyzer acquires image data processed by the analyzer before the current image data, which is to be processed, and stored in the storage unit and analyzes the current image data using the acquired image data as the reference data.

4. The information processor according to claim 1, wherein, when the encoded data is discarded by the discarding section, the encoder increases the amount of code of subsequent encoded data generated through the encoding.

5. The information processor according to claim 1, further comprising:
    a redundancy encoder configured to perform redundancy encoding with respect to the encoded data generated through encoding the current image data by the encoder and generate redundant data.

6. The information processor according to claim 5, wherein, when the current image data is similar to the reference image data, the transmitter transmits the redundant data generated by the redundancy encoder.

7. The information processor according to claim 1, further comprising:
    the storage unit configured to store a plurality of image data corresponding to a plurality of still images.

8. The information processor according to claim 1, wherein the current image data stored in the storage unit is not encoded by the encoder.

9. An information processing method for an information processor which processes image data, the method comprising:
    by an analyzer, analyzing current image data to obtain a level of similarity between current image data, which is to be processed, and reference image data;
    determining whether or not the current image data and the reference image data are similar to each other depending on whether or not the level of similarity reaches a predetermined threshold;
    storing the current image data in a storage unit irrespective of whether the current image data is determined to be similar to the reference image data;
    by an encoder, encoding the current image data;
    by a discarding section, discarding encoded data generated from the current image data by the encoder when the current image data is determined to be similar to the reference image data; and
    by a transmitter, transmitting the encoded data generated from the current image data encoded by the encoder when the current image data is determined not to be similar to the reference image data.

* * * * *